(12) United States Patent
Guyan

(10) Patent No.: US 10,010,133 B2
(45) Date of Patent: Jul. 3, 2018

(54) MIDSOLE LATTICE WITH HOLLOW TUBES FOR FOOTWEAR

(71) Applicant: Under Armour, Inc., Baltimore, MD (US)

(72) Inventor: Alan Guyan, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 0 days.

(21) Appl. No.: 15/148,578

(22) Filed: May 6, 2016

(65) Prior Publication Data

US 2016/0324260 A1   Nov. 10, 2016

Related U.S. Application Data

(60) Provisional application No. 62/158,974, filed on May 8, 2015.

(51) Int. Cl.
| *A43B 13/14* | (2006.01) |
| *A43B 7/14* | (2006.01) |
| *A43B 13/02* | (2006.01) |
| *A43B 3/00* | (2006.01) |
| *A43B 13/04* | (2006.01) |
| *A43B 13/12* | (2006.01) |
| *A43B 13/16* | (2006.01) |
| *A43B 13/18* | (2006.01) |
| *A43B 13/20* | (2006.01) |
| *B33Y 80/00* | (2015.01) |
| *B29C 64/00* | (2017.01) |

(52) U.S. Cl.
CPC .......... *A43B 13/143* (2013.01); *A43B 3/0052* (2013.01); *A43B 7/14* (2013.01); *A43B 7/1405* (2013.01); *A43B 7/1415* (2013.01); *A43B 13/02* (2013.01); *A43B 13/04* (2013.01); *A43B 13/125* (2013.01); *A43B 13/127* (2013.01); *A43B 13/14* (2013.01); *A43B 13/16* (2013.01); *A43B 13/181* (2013.01); *A43B 13/186* (2013.01); *A43B 13/188* (2013.01); *A43B 13/20* (2013.01); *A43B 13/206* (2013.01); *B29C 64/00* (2017.08); *B33Y 80/00* (2014.12); *A43D 2200/60* (2013.01)

(58) Field of Classification Search
CPC ....... A43B 1/0009; A43B 1/00; A43B 3/0036; A43B 3/0052; A43B 13/00; A43B 13/02; A43B 13/14
USPC ..................... 36/25 R, 28, 29, 141, 30 R, 31
See application file for complete search history.

(56) References Cited

U.S. PATENT DOCUMENTS

| 1,800,406 A | 4/1931 | Rice |
| 4,168,341 A | 9/1979 | Siedenstrang et al. |

(Continued)

FOREIGN PATENT DOCUMENTS

| AU | 2008207351 | 3/2009 |
| CN | 1190560 | 8/1998 |

(Continued)

*Primary Examiner* — Marie Bays
(74) *Attorney, Agent, or Firm* — Maginot, Moore & Beck LLP

(57) ABSTRACT

An article of footwear includes an upper and a midsole connected to upper. The midsole includes a lattice structure with a plurality of laths. The lattice structure includes at least one hollow lath such that an inner void is formed within the at least one hollow lath. A loose granular material is provided within the inner void of the at least one hollow lath.

19 Claims, 28 Drawing Sheets

(56) References Cited

U.S. PATENT DOCUMENTS

| | | | |
|---|---|---|---|
| 4,170,078 A * | 10/1979 | Moss | A43B 13/203 36/28 |
| 4,245,406 A | 1/1981 | Landay | |
| 4,297,796 A | 11/1981 | Stirtz et al. | |
| 4,316,335 A | 2/1982 | Giese | |
| 4,535,553 A | 8/1985 | Derderian et al. | |
| 4,546,556 A | 10/1985 | Stubblefield | |
| 4,598,487 A | 7/1986 | Misevich | |
| 4,663,865 A | 5/1987 | Telecemian | |
| 4,686,781 A * | 8/1987 | Bury | A43B 3/00 36/11.5 |
| 4,769,927 A | 9/1988 | Liggett et al. | |
| 4,845,863 A | 7/1989 | Yung-Mao | |
| 4,863,538 A | 9/1989 | Deckard | |
| 4,864,738 A * | 9/1989 | Horovitz | A43B 13/20 2/413 |
| 4,938,816 A | 7/1990 | Beaman et al. | |
| 5,005,575 A * | 4/1991 | Geri | A43B 7/14 36/43 |
| 5,022,168 A | 6/1991 | Jeppson, III et al. | |
| 5,117,566 A * | 6/1992 | Lloyd | A43B 13/20 36/28 |
| 5,156,697 A | 10/1992 | Bourell et al. | |
| 5,231,776 A * | 8/1993 | Wagner | A43B 5/00 36/1 |
| 5,255,451 A | 10/1993 | Tong et al. | |
| 5,261,169 A * | 11/1993 | Williford | A43B 1/0045 36/43 |
| 5,337,492 A | 8/1994 | Anderie et al. | |
| 5,348,693 A | 9/1994 | Taylor et al. | |
| 5,367,791 A | 11/1994 | Gross et al. | |
| 5,408,761 A | 4/1995 | Gazzano | |
| 5,461,800 A | 10/1995 | Luthi et al. | |
| 5,465,509 A | 11/1995 | Fuerst et al. | |
| 5,511,323 A | 4/1996 | Dahlgren | |
| 5,619,809 A | 4/1997 | Sessa | |
| 5,661,864 A | 9/1997 | Valiant et al. | |
| 5,678,329 A | 10/1997 | Griffin et al. | |
| 5,682,685 A | 11/1997 | Terlizzi | |
| 5,771,610 A | 6/1998 | McDonald | |
| 5,876,767 A | 3/1999 | Mattes et al. | |
| 5,896,680 A | 4/1999 | Kim et al. | |
| 5,908,569 A | 6/1999 | Wilkening et al. | |
| 5,983,524 A | 11/1999 | Polegato | |
| 6,006,412 A | 12/1999 | Bergmann et al. | |
| 6,029,376 A | 2/2000 | Cass | |
| 6,108,943 A | 8/2000 | Hudson et al. | |
| 6,110,411 A | 8/2000 | Clausen et al. | |
| 6,193,923 B1 | 2/2001 | Leyden et al. | |
| 6,205,682 B1 | 3/2001 | Park | |
| 6,259,962 B1 | 7/2001 | Gothait | |
| 6,360,454 B1 | 3/2002 | Dachgruber et al. | |
| 6,367,172 B2 | 4/2002 | Hernandez | |
| 6,412,196 B1 | 7/2002 | Gross | |
| 6,533,885 B2 | 3/2003 | Davis et al. | |
| 6,540,864 B1 | 4/2003 | Chi | |
| 6,601,042 B1 | 7/2003 | Lyden | |
| 6,601,321 B1 | 8/2003 | Kendall | |
| 6,660,209 B2 | 12/2003 | Leyden et al. | |
| 6,694,207 B2 | 2/2004 | Darrah et al. | |
| 6,763,611 B1 * | 7/2004 | Fusco | A43B 13/125 36/25 R |
| 6,769,202 B1 | 8/2004 | Luthi et al. | |
| 6,817,112 B2 | 11/2004 | Berger et al. | |
| 6,819,966 B1 | 11/2004 | Haeberli | |
| 7,065,820 B2 | 6/2006 | Meschter | |
| 7,077,638 B2 | 7/2006 | Leyden et al. | |
| RE39,354 E | 10/2006 | Dickens, Jr. et al. | |
| 7,148,286 B2 | 12/2006 | Baumann et al. | |
| 7,207,125 B2 | 4/2007 | Jeppesen et al. | |
| 7,291,002 B2 | 11/2007 | Russell et al. | |
| 7,424,783 B2 | 9/2008 | Meschter et al. | |
| 7,484,318 B2 * | 2/2009 | Finkelstein | A43B 13/187 36/153 |
| 7,571,556 B2 | 8/2009 | Hardy et al. | |
| 7,788,827 B2 | 9/2010 | Fogg et al. | |
| 7,805,859 B2 * | 10/2010 | Finkelstein | A43B 13/187 36/153 |
| 8,522,454 B2 | 9/2013 | Schindler | |
| 9,320,316 B2 | 4/2016 | Guyan et al. | |
| 9,572,402 B2 | 2/2017 | Jarvis | |
| 9,788,600 B2 | 10/2017 | Wawrousek | |
| 2001/0001904 A1 | 5/2001 | Hernadez | |
| 2002/0023306 A1 | 2/2002 | Sajedi et al. | |
| 2003/0051372 A1 | 3/2003 | Lyden | |
| 2003/0069807 A1 | 4/2003 | Lyden | |
| 2004/0104499 A1 | 6/2004 | Keller | |
| 2004/0111920 A1 | 6/2004 | Cretinon | |
| 2004/0118018 A1 | 6/2004 | Dua | |
| 2004/0134099 A1 | 7/2004 | Jones et al. | |
| 2004/0135292 A1 | 7/2004 | Coats et al. | |
| 2004/0159014 A1 * | 8/2004 | Sommer | A43B 13/189 36/28 |
| 2004/0168329 A1 | 9/2004 | Ishimaru | |
| 2004/0261295 A1 | 12/2004 | Meschter | |
| 2005/0076536 A1 | 4/2005 | Hatfield et al. | |
| 2005/0188564 A1 | 9/2005 | Delgorgue et al. | |
| 2005/0282245 A1 | 12/2005 | Meschter et al. | |
| 2006/0061012 A1 | 3/2006 | Hatfield et al. | |
| 2006/0061613 A1 | 3/2006 | Fienup et al. | |
| 2006/0064905 A1 | 3/2006 | Hudson et al. | |
| 2006/0065499 A1 | 3/2006 | Smaldone et al. | |
| 2006/0070260 A1 | 4/2006 | Cavanaugh et al. | |
| 2006/0143839 A1 | 7/2006 | Fromme | |
| 2006/0201028 A1 | 9/2006 | Chan | |
| 2006/0254087 A1 | 11/2006 | Fechter | |
| 2007/0022631 A1 | 2/2007 | Ho | |
| 2007/0163147 A1 | 7/2007 | Cavanagh et al. | |
| 2007/0227041 A1 | 10/2007 | Menghini | |
| 2007/0232753 A1 | 10/2007 | Monsheimer et al. | |
| 2007/0240333 A1 | 10/2007 | Le et al. | |
| 2008/0060221 A1 * | 3/2008 | Hottinger | A43B 3/108 36/28 |
| 2008/0115389 A1 | 5/2008 | Hsieh | |
| 2008/0215176 A1 | 9/2008 | Borovinskih et al. | |
| 2008/0289218 A1 | 11/2008 | Nakano | |
| 2009/0012622 A1 | 1/2009 | James | |
| 2009/0014424 A1 | 1/2009 | Meschter | |
| 2009/0126225 A1 | 5/2009 | Jarvis | |
| 2009/0145005 A1 | 6/2009 | Murphy et al. | |
| 2009/0211119 A1 | 8/2009 | Moretti | |
| 2009/0316965 A1 | 12/2009 | Milling et al. | |
| 2010/0050480 A1 | 3/2010 | Polegato Moretti | |
| 2010/0229430 A1 | 9/2010 | Berger et al. | |
| 2011/0265352 A1 | 11/2011 | Lin | |
| 2011/0277349 A1 | 11/2011 | Kim | |
| 2012/0011782 A1 | 1/2012 | Kolås | |
| 2012/0055043 A1 | 3/2012 | Schindler | |
| 2012/0117825 A9 | 5/2012 | Jarvis | |
| 2014/0002019 A1 | 1/2014 | Park | |
| 2014/0002677 A1 | 1/2014 | Schinker | |
| 2014/0002903 A1 | 1/2014 | Shim | |
| 2014/0020191 A1 | 1/2014 | Jones et al. | |
| 2014/0025978 A1 | 1/2014 | Tokunaga | |
| 2014/0026773 A1 | 1/2014 | Miller | |
| 2014/0029030 A1 | 1/2014 | Miller | |
| 2014/0029900 A1 | 1/2014 | Logan | |
| 2014/0030067 A1 | 1/2014 | Kim | |
| 2014/0109440 A1 | 4/2014 | McDowell | |
| 2014/0109441 A1 | 4/2014 | McDowell et al. | |
| 2014/0115920 A1 | 5/2014 | McCue | |
| 2014/0182170 A1 | 7/2014 | Wawrousek | |
| 2014/0226773 A1 | 8/2014 | Toth et al. | |
| 2014/0259787 A1 | 9/2014 | Guyan et al. | |
| 2014/0299009 A1 | 10/2014 | Miller et al. | |
| 2014/0300675 A1 | 10/2014 | Miller et al. | |
| 2014/0300676 A1 | 10/2014 | Miller et al. | |
| 2015/0033581 A1 | 2/2015 | Barnes et al. | |
| 2015/0128448 A1 * | 5/2015 | Lockyer | A43B 7/1415 36/28 |
| 2015/0193559 A1 | 7/2015 | Musuvathy | |
| 2016/0051009 A1 | 2/2016 | Kormann | |

(56) References Cited

U.S. PATENT DOCUMENTS

| | | | |
|---|---|---|---|
| 2016/0095385 A1* | 4/2016 | Nordstrom | A43B 13/181 36/29 |
| 2016/0242502 A1 | 8/2016 | Spanks | |
| 2016/0374428 A1* | 12/2016 | Kormann | A43B 13/186 36/28 |
| 2017/0224053 A1 | 8/2017 | Truelsen | |
| 2017/0231322 A1 | 8/2017 | Gheorghian | |
| 2017/0332733 A1 | 11/2017 | Cluckers | |

FOREIGN PATENT DOCUMENTS

| | | |
|---|---|---|
| CN | 2357543 | 1/2000 |
| CN | 1252344 | 5/2000 |
| CN | 2676682 | 2/2005 |
| DE | 202004018209 | 1/2005 |
| DE | 102005023473 | 11/2006 |
| EP | 0526892 A3 | 7/1993 |
| EP | 0526892 A2 | 10/1993 |
| EP | 2564719 A1 | 6/2013 |
| EP | 2424398 B1 | 12/2015 |
| ES | 2442448 A1 | 2/2014 |
| JP | 08-197652 | 8/1996 |
| JP | 09-057874 | 3/1997 |
| JP | 09-277384 A | 10/1997 |
| JP | 10-240964 | 9/1998 |
| JP | 2002-001827 A | 1/2002 |
| JP | 2004-042545 A | 2/2004 |
| JP | 2009-045244 A | 3/2009 |
| WO | 0053398 | 9/2000 |
| WO | 2001024575 | 4/2001 |
| WO | 2004018966 | 3/2004 |
| WO | 2004073416 | 9/2004 |
| WO | 29004092346 | 10/2004 |
| WO | 2006034261 | 3/2006 |
| WO | 2006047259 | 5/2006 |
| WO | 2006098715 A1 | 9/2006 |
| WO | WO2006098715 A1 | 9/2006 |
| WO | 2008010855 | 1/2008 |
| WO | 2009035831 | 3/2009 |
| WO | 2009114715 | 3/2009 |
| WO | 2009055451 | 4/2009 |
| WO | 2009086520 | 7/2009 |
| WO | WO2009086520 A1 | 7/2009 |
| WO | WO2009055451 A8 | 6/2010 |
| WO | 2010126708 A2 | 11/2010 |
| WO | 2014008331 A2 | 1/2014 |
| WO | 2014009587 | 1/2014 |
| WO | 2014015037 A2 | 1/2014 |
| WO | 2014100462 A1 | 6/2014 |

* cited by examiner

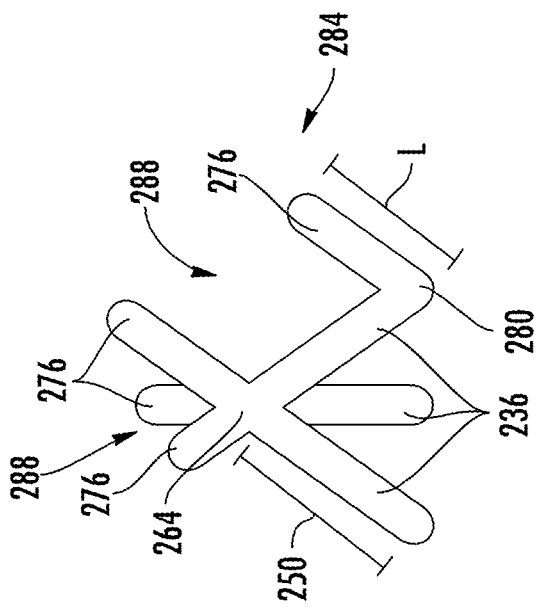
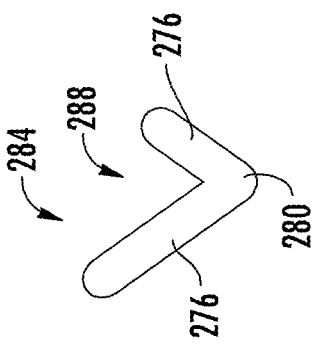
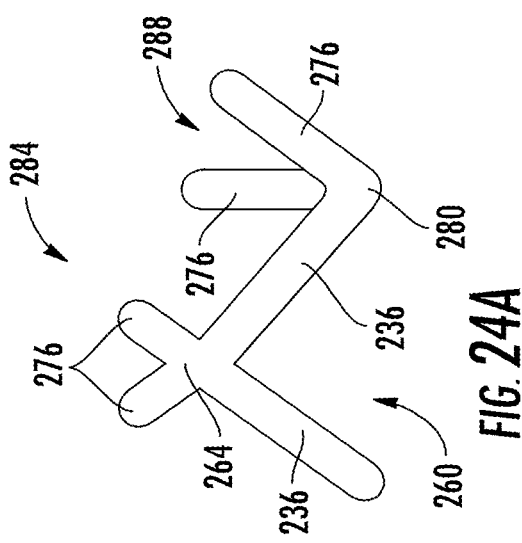
FIG. 24A
FIG. 24B
FIG. 24C

MIDSOLE LATTICE WITH HOLLOW TUBES FOR FOOTWEAR

CROSS-REFERENCE TO RELATED APPLICATIONS

This patent document claims priority from U.S. Provisional Patent Application Ser. No. 62/158,974, filed May 8, 2015, the entire contents of which are incorporated herein by reference.

FIELD

This patent document relates generally to shoes and specifically to support arrangements for articles of footwear.

BACKGROUND

FIG. 28 shows an article of footwear according to the prior art in the form of a shoe 10 to be worn on a foot of a user with a portion of the shoe 10 cut away so that the inside of the shoe 10 is partially visible. The shoe 10 includes an upper 14 and a sole 18 coupled to the upper 14. The upper 14 covers the top and sides of the user's foot, and the sole 18 covers the bottom of the user's foot and makes contact with the ground. The sole 18 typically includes an insole 22, a midsole 26, and an outsole 30 which cushion and protect the user's foot while the user makes contact with the ground. The insole 22 contacts the user's foot, the outsole 30 contacts the ground, and the midsole 26 is arranged between the insole 22 and the outsole 30. The insole 22 generally provides a comfortable surface for contact with the user's foot and is typically comprised of a thin layer of a man-made material such as, for example, ethylene vinyl acetate (EVA). The midsole 26 generally provides most of the cushioning and shock absorption for the foot of the user and is typically comprised of a polymer such as, for example, polyurethane, surrounding another material such as, for example, a foam, a gel, or recesses filled with air. The outsole 30 generally provides a durable surface which can sustain repeated impact and friction with the ground and is typically comprised of a durable material, such as, for example, carbon rubber or blown rubber.

The sole 18 includes a heel end 34 arranged where a user's heel is positioned when wearing the shoe 10 and a toe end 38 arranged opposite the heel end 34 where the user's toes are positioned when wearing the shoe 10. The sole 18 also includes a medial side 42 arranged closest to the user's center of symmetry when wearing the shoe 10 and a lateral side 46 arranged opposite the medial side 42 farther from the user's center of symmetry when wearing the shoe 10.

Turning now to FIG. 29 and FIG. 30, schematic drawings of a user's foot 50 are shown including a heel 54, toes 56, an arch 58, a medial side 60, and a lateral side 62. FIG. 29 depicts a perspective lateral side view of the bone structure of the foot 50, and FIG. 30 depicts a bottom view of the foot 50 including a plurality of regions located relative to the heel 54, toes 56, arch 58, medial side 60, and lateral side 62. A calcaneus region 66 (shown in FIG. 29) on the bottom of the foot 50 is located substantially beneath a calcaneus bone 68 (shown in FIG. 29) of the user, near the heel 54. A talus region 70 (shown in FIG. 30) on the bottom of the foot 50 is located substantially beneath a talus bone 72 (shown in FIG. 29) of the user, between the heel 54 and the arch 58. A longitudinal arch region 74 (shown in FIG. 30) on the bottom of the foot 50 is located substantially beneath a navicular bone 76, a cuboid bone 78 and cuneiform bones 80 (shown in FIG. 29) of the user, near the arch 58. A metatarsal region 82 (shown in FIG. 30) on the bottom of the foot 50 is located substantially beneath metatarsal bones 84 (shown in FIG. 29) of the user, between the arch 58 and the toes 56. A ball of the foot region 86 (shown in FIG. 30) on the bottom of the foot 50 is located substantially beneath the metatarsal-phalangeal joints 88 and sesamoids 90 (shown in FIG. 29) of the user, between the arch 58 and the toes 56 and closer to the medial side 60 than the lateral side 62. A toe region 92 (shown in FIG. 30) on the bottom of the foot 50 is located substantially beneath phalangeal bones 94 (shown in FIG. 30) of the user, near the toes 56.

When propelling himself on his feet, the user applies different amounts of pressure at different times to the various bones in each foot 50 during what is known as a gait cycle. For example, during a typical walking motion, the gait cycle begins when the user first contacts the ground with the heel 54 of his foot 50, thereby applying pressure to the calcaneus bone 68. As the user shifts his weight forward on his foot 50, he applies less pressure to the calcaneus bone 68 and begins to apply pressure to the talus bone 72, the navicular bone 76, the cuboid bone 78, and the cuneiform bones 80. As the user begins to propel himself off his foot 50, he applies less pressure to the talus bone 72, the navicular bone 76, the cuboid bone 78, and the cuneiform bones 80 and begins to apply pressure to the metatarsal bones 84. As the user propels himself forward, he applies pressure along the metatarsal bones 84 and to the metatarsal-phalangeal joints 88 and sesamoids 90. Finally, as the user begins to toe off and end contact with the ground, he applies less pressure to the metatarsal-phalangeal joints 88 and sesamoids 90 and applies pressure to the phalangeal bones 94. Finally, to toe off, the user applies pressure to the phalangeal bones 94 to propel forward. The user then lifts his foot 50 into a leg swing, and places it down in a location forward relative to where he lifted it. When the user places his foot 50 down again, he first contacts the ground with the heel 54, beginning a new cycle of the walking motion.

Many styles of forward propulsion, including many styles of walking and running, apply a gait cycle substantially similar to that described above. In some styles of forward propulsion, such as, for example, sprinting or shuffling, different amounts of pressure are applied to different portions of the foot 50 for different amounts of time. Additionally, the particular amounts of pressure applied to different portions of the foot 50 can vary from one individual to another. For example, some individuals apply more pressure to the medial side 60 than the lateral side 62 as they progress through the gait cycle. This particular application of pressure is known as pronation. In contrast, some individuals apply more pressure to the lateral side 62 than the medial side 60 as they progress through the gait cycle. This particular application of pressure is known as supination. Additionally, some individuals apply more pressure to their heels 54 when contacting the ground and some contact the ground with a portion of their feet nearer to the arch 58.

Shoes are designed to support and protect the feet of users during gait cycles to provide comfort and to promote efficient propulsion. However, due to differences between individuals in both foot anatomy and personal gait cycle style, some shoes are more comfortable and useful for some users than others. Additionally, producing a shoe configured to meet the variety of needs during all stages of the gait cycle can include producing a large number of different specialized parts which must be assembled into the shoe. Production and assembly of parts are contributing factors to the cost of the shoe. In general, a shoe having a larger number of parts is more expensive to produce than a shoe having a smaller number of parts. In view of the foregoing, it would be advantageous to provide a shoe that is comfortable and useful for a user and that is inexpensive to produce. It would also be advantageous to provide a shoe with a support arrangement that can be easily customized to meet the unique needs of various foot anatomies and individual gait styles. It would be of further advantage if the shoe were configured to provide improved performance qualities for the user, such as improved stability, sound and energy dampening, reduced weight, and energy return qualities.

SUMMARY

In accordance with one exemplary embodiment of the disclosure, there is provided an article of footwear comprising an upper and a sole member connected to the upper. The sole member includes a plurality of tubular structures. The plurality of tubular structures are at least partially filled with a loose granular material.

In at least one additional exemplary embodiment of the disclosure, there is provided an article of footwear including an upper and a midsole connected to upper. The midsole includes a lattice structure with a plurality of laths. The lattice structure includes at least one hollow lath such that an inner void is formed within the at least one hollow lath. A loose granular material is provided within the inner void of the at least one hollow lath.

In yet another exemplary embodiment of the disclosure, there is provided a method of making an article of footwear. The method comprises ejecting a granular material onto each of a plurality of layers of a lattice structure of a sole member. The method further comprises sintering a first portion of the ejected granular material in each of the plurality of layers to form a tubular structure for the lattice structure. Additionally, the method comprises leaving a second portion of the ejected granular material un-sintered in each of the plurality of layers such that loose powder is provided within the tubular structure. Furthermore, the method comprises coupling the lattice structure to an upper of the article of footwear.

The above described features and advantages, as well as others, will become more readily apparent to those of ordinary skill in the art by reference to the following detailed description and accompanying drawings.

BRIEF DESCRIPTION OF THE DRAWINGS

FIG. 24A is a side view illustrating lath arrangements in the lattice of FIG. 19.

FIG. 24B is a side view illustrating lath arrangements in the lattice of FIG. 19.

FIG. 24C is a side view illustrating lath arrangements in the lattice of FIG. 19.

DETAILED DESCRIPTION

Figure 1:
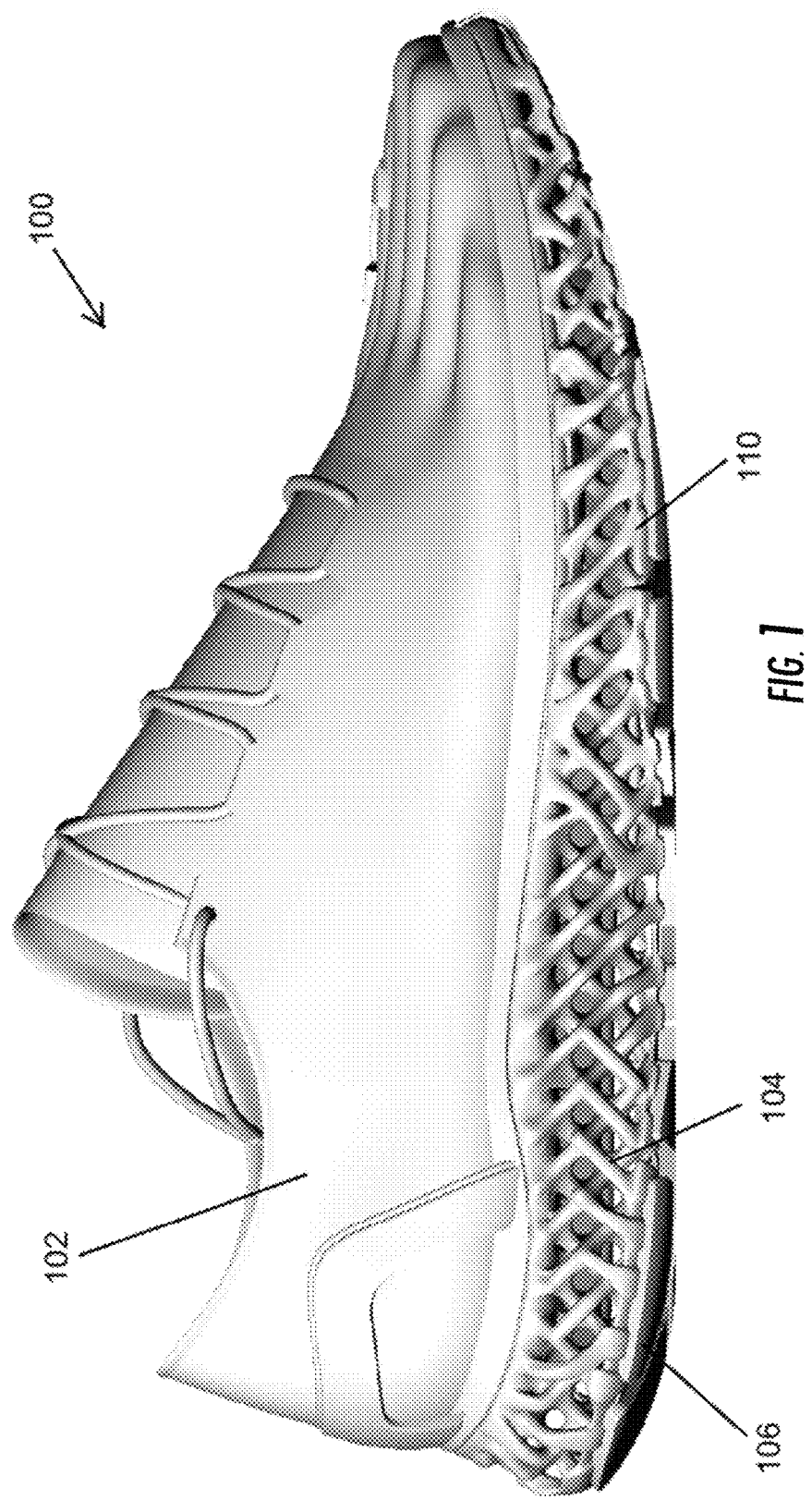
FIG. 1 is a side view of an article of footwear including a midsole comprising a lattice structure.

With reference now to FIGS. 1-6, an article of footwear 100 includes an upper 102, a midsole 104 and an outsole 106. The midsole 104 is provided between the upper 102 and the outsole 106 and is formed of two components. The midsole 104 includes a lattice structure 110 comprising a plurality of laths 114 connected together at a plurality of nodes 116. The construction of the laths 114 may vary in different regions of the midsole 104. As a result, the performance qualities of the midsole may vary between different regions of the midsole 104. The lattice structure 110 provides increased stability and energy return qualities while also delivering different performance qualities in different regions of the midsole 104.

Arrangement of Article of Footwear

The upper 102 includes a plurality of components that cover the foot of a user when the article of footwear 100 is worn. The upper 102 may include any of various sections, including the vamp, the heel, the tongue, and any of various other components such as fabric panels, leather strips, foam padding, polymer support structures, or fastening elements. The upper 102 in combination with the insole (not shown) form a foot cavity for the article of footwear 100. The insole is positioned under the foot of the wearer and abuts the midsole 104. The insole may include various components such as a strobel board and a sock liner. Various methods may be used to attach the upper 102 and the insole to the midsole 104, including the use of adhesives, welting, or any of various other methods as will be recognized by those of ordinary skill in the art.

The components of the upper 102 may be presented in any of various configurations and thereby provide different forms of the footwear. For example, the upper 102 may be configured as a low-cut running shoe, a high-top basketball shoe, or any of various other forms of athletic shoes. The upper 102 may also be configured with various tightening mechanisms to secure the article of footwear 100 to the foot of the wearer. For example, the upper 102 may be configured such that the article of footwear 100 is a lace-up shoe, a slip-on shoe, or a strap-tightened boot.

In addition to being provided in any of various forms and configurations, the upper 102 may also be comprised of any of various materials. For example, the upper may include polyester, elastane, mesh, synthetic leather or natural leather, or any of various other materials or combinations thereof. The materials used on the upper 102 may depend, in part, on the particular type of footwear formed by the upper 102. For example, heavier and more rugged materials such as leather may be more prevalent on the upper 102 if the article of footwear is provided in the form of a boot or a cleat. Conversely, light-weight mesh or elastane fabric may be more prevalent on the upper 102 if the article of footwear is provided in as a running shoe.

The midsole 104 is connected to upper 102 and is generally positioned underneath the upper (e.g., underneath a sock liner of the upper). As described in further detail below, the midsole 104 includes a lattice structure 110, which includes plurality of interconnected laths 114. The laths 114 are joined together at nodes 116 to provide a network of laths that extends between the lower platform 112 and the upper shelf 118 of the lattice structure 110. The laths 114 may be configured and connected in any of various configurations to form the lattice structure.

Figure 6:
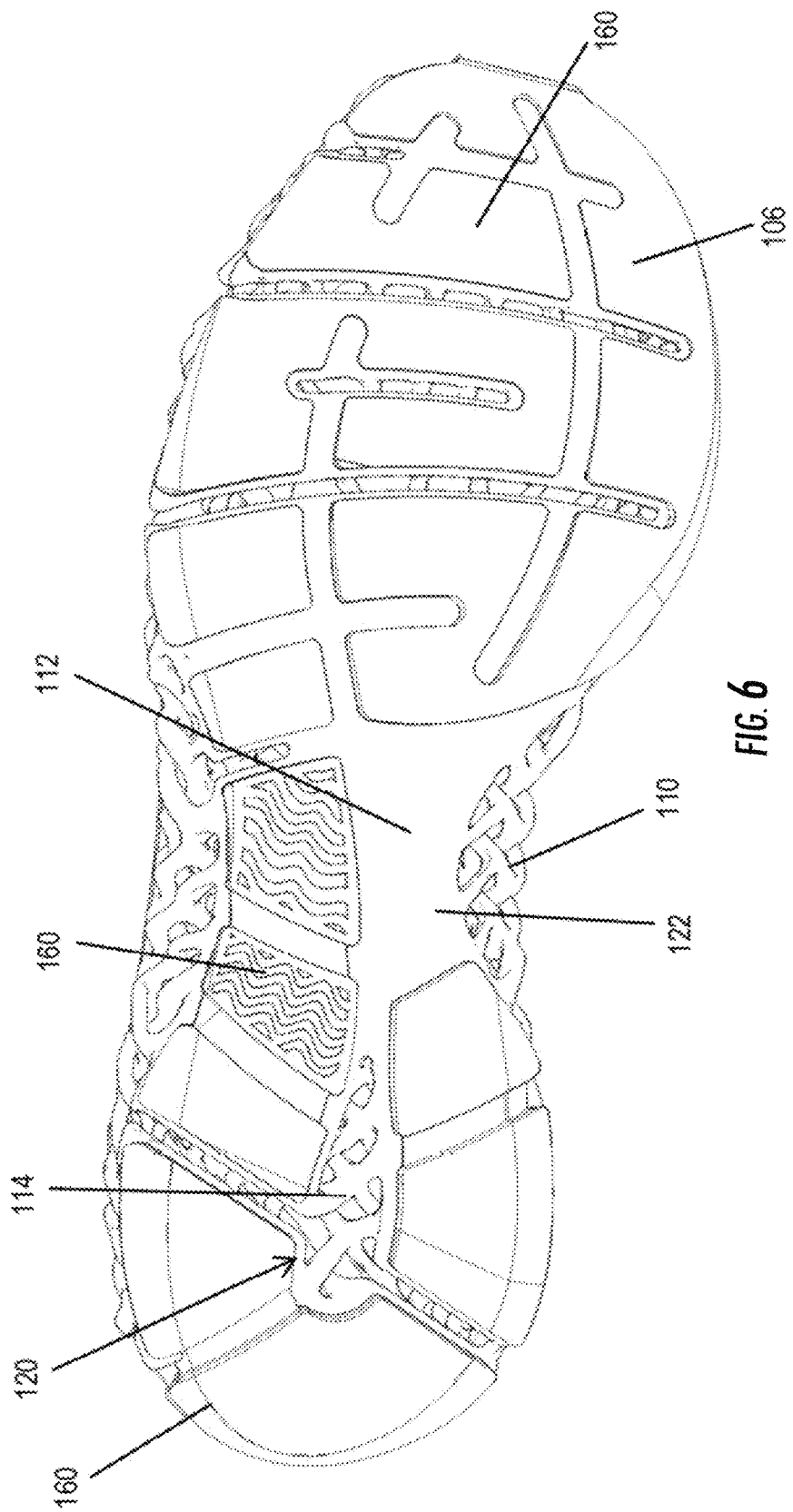
FIG. 6 is a bottom view of the lattice structure of FIG. 2 with an outsole for the article of footwear attached thereto.

The outsole 106 is connected to the bottom of the midsole 104 such that the midsole 104 is positioned between the upper 102 and the outsole 106. As shown in FIG. 6, the outsole 106 is provided by the durable pads 160 that are connected to a bottom surface of the midsole 104. The durable pads 160 are strips or panels of material formed in shapes that fit within sections 128 of the downward facing surface 122 of the lattice structure 110. An adhesive or other appropriate means may be used to connect the durable pads 160 to the downward facing surface 122 of the lattice structure 110. While a plurality of durable pads 160 form the outsole 106 in the embodiment of FIG. 11, a single durable pad that substantially or completely covers the downward facing surface 122 of the midsole may alternatively be used to form the outsole 106. The one or more durable pads 160 may be formed from any of various materials that provide the desired features and performance qualities of an outsole. In at least one embodiment, the durable pads are comprised of exterior grade EVA foam. The exterior grade EVA foam is a resilient material that provides an appropriate measure of traction and wear resistance for the outsole 106. In other embodiments, other materials may be used to provide the outsole, such as natural or synthetic rubber materials.

Midsole Lattice Construction

As noted above, the midsole 104 includes a lattice structure 110. As shown in FIGS. 1-6, the lattice structure 110 includes a lower platform 112, a plurality of interconnected laths 114, and an upper shelf 118. The laths 114 are joined together at nodes 116 to provide a network of laths that extends between the lower platform 112 and the upper shelf 118 of the lattice structure 110. The laths 114 may be configured and connected in any of various configurations to form the lattice structure 110.

In at least one embodiment, including the embodiment of FIGS. 1-6 (and discussed in further detail below with reference to FIGS. 11 and 12) the laths 114 are generally wave-like structures, forming alternating layers of parallel waves and perpendicular waves, with each layer joined to an adjacent layer at the peaks and valleys of the waves. Accordingly, the nodes 116 are formed at the peaks and the valleys of the wave-like laths 114.

Figure 2:
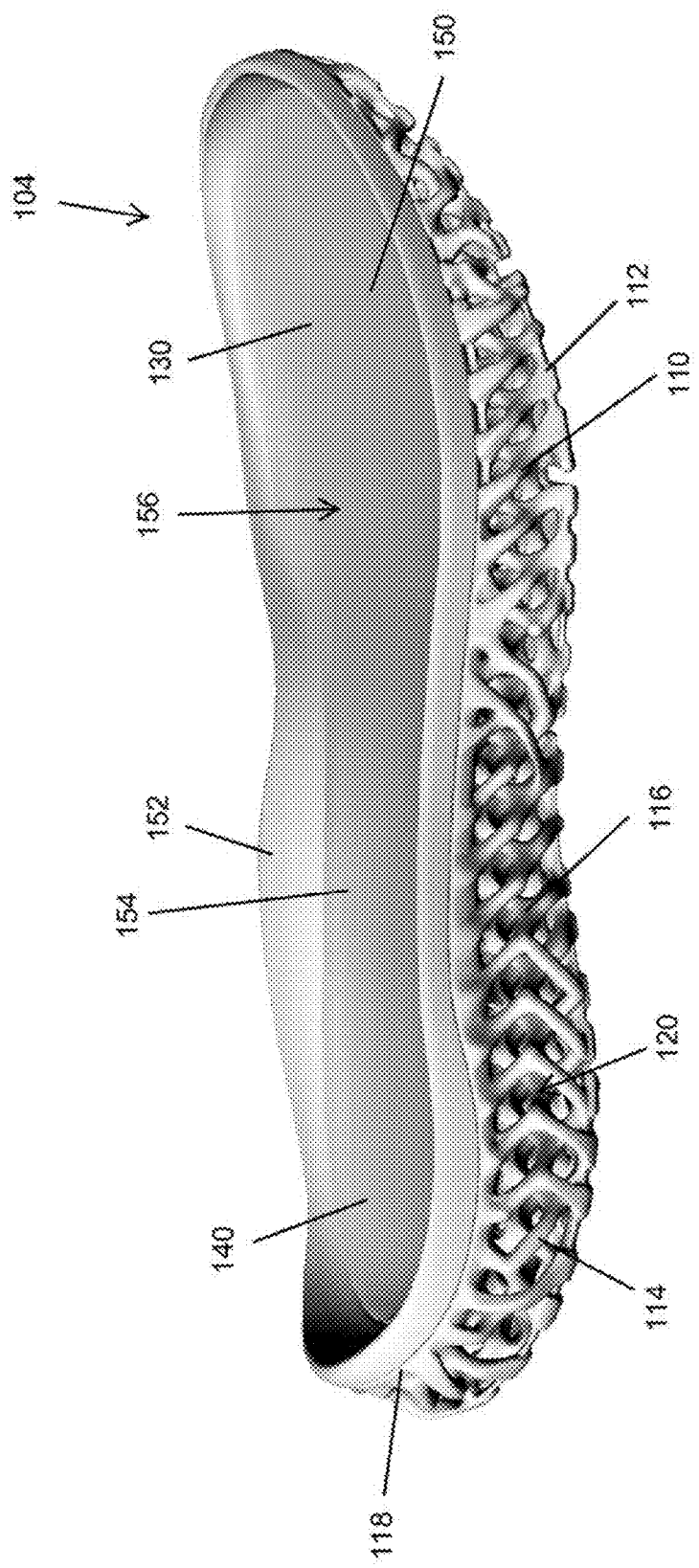
FIG. 2 is an upper perspective view of the midsole of FIG. 1 including a resilient insert positioned in a recess formed within the lattice structure.
Figure 3:
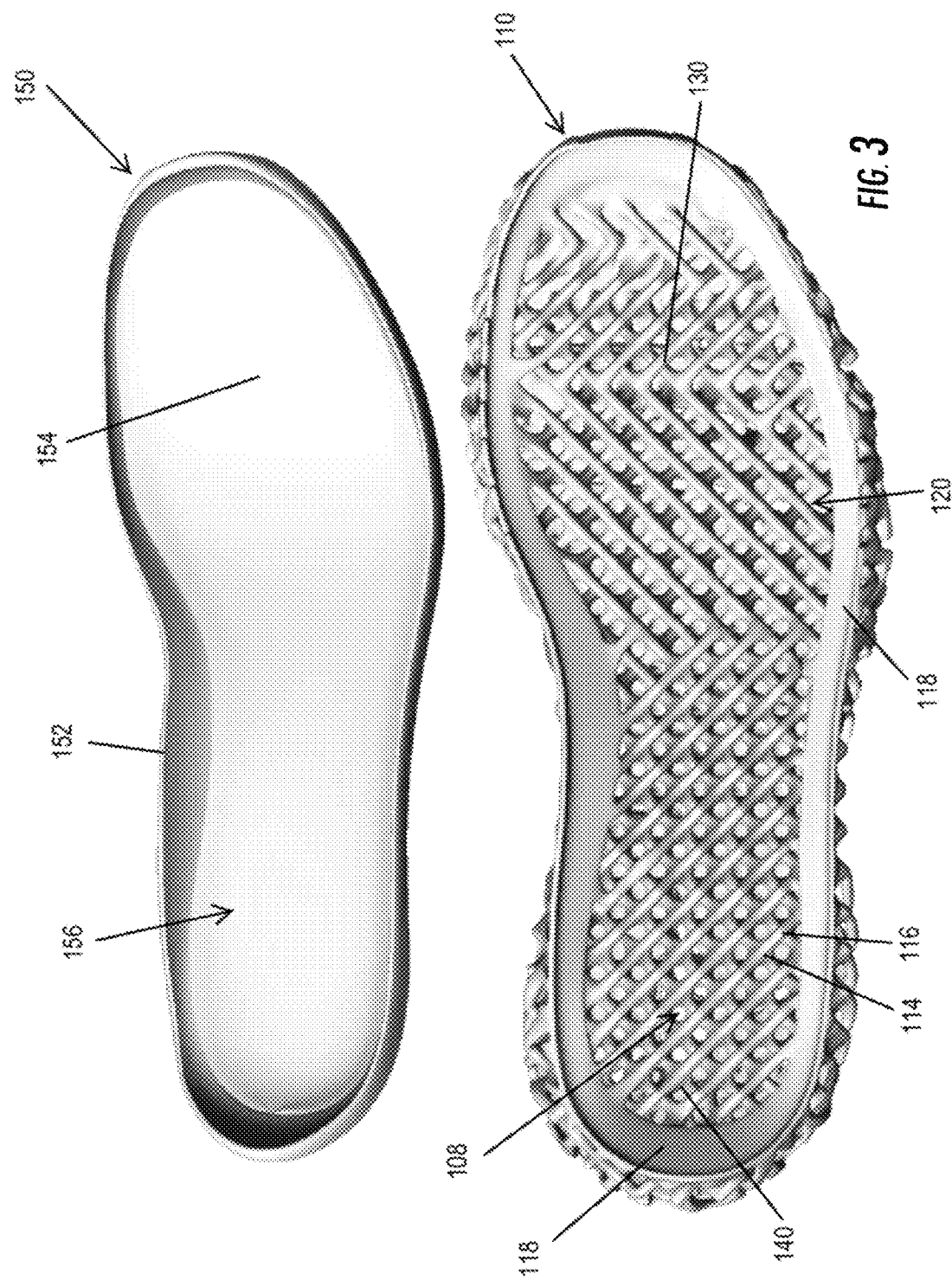
FIG. 3 is a top view of the midsole of FIG. 2 with the resilient insert removed from the lattice structure to expose a recess in the lattice structure.
Figure 4:
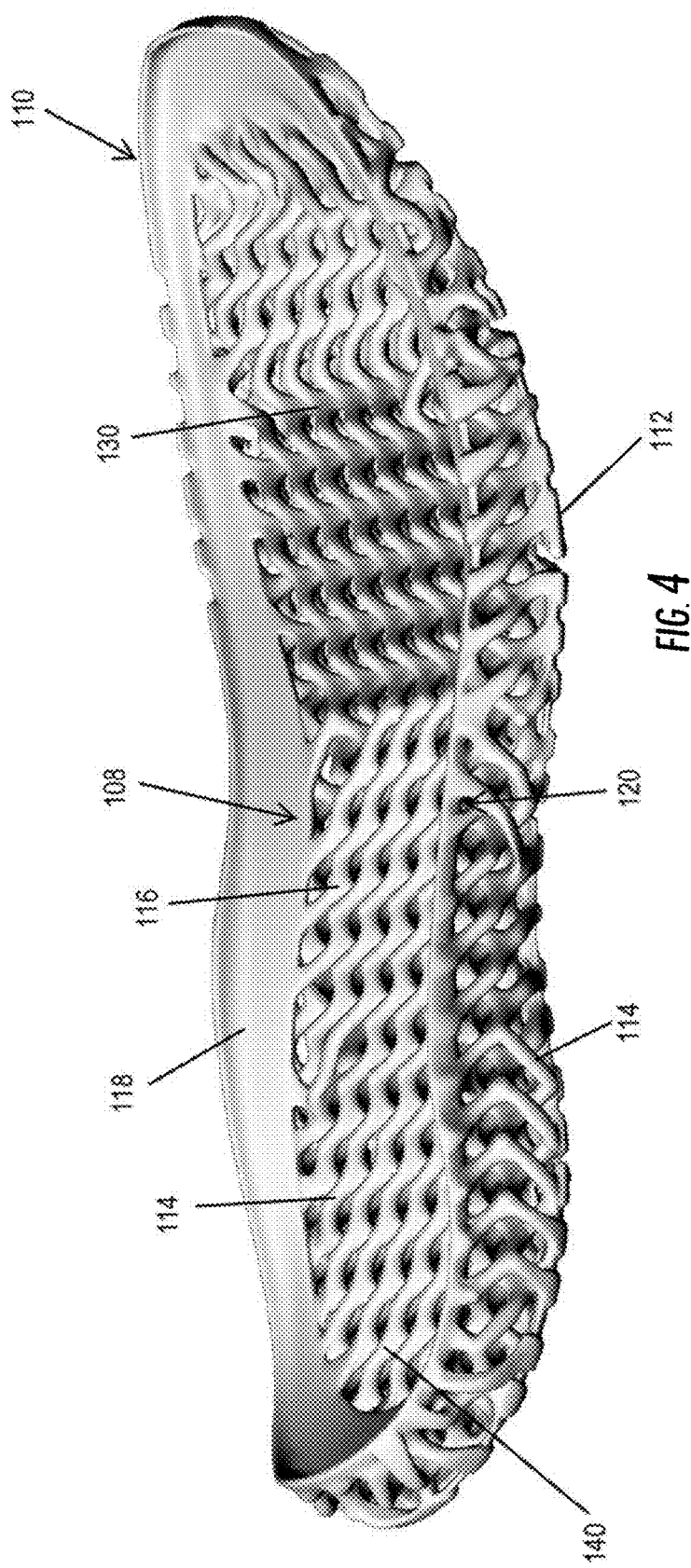
FIG. 4 is a side perspective view of the lattice structure of FIG. 2.

With continued reference to FIGS. 2-4, openings 120 (which may also be referred to herein as "voids") are formed in the lattice structure 110 between the plurality of laths 114 and the plurality of nodes 116. The openings 120 form a network of passages through the lattice structure 110. These passages include direct and indirect passages through the lattice structure 110 from the lateral side to the medial side of the lattice structure, and from the front to the back of the lattice structure 110. Accordingly, air and moisture are permitted to pass through the midsole in a lateral direction from the medial side to the lateral side of the lattice structure 110, and vice-versa, and from the front to the back of the lattice structure 110, and vice-versa.

The upper shelf 118 of the lattice structure 110 provides a relatively smooth and continuous surface that extends around the upper perimeter of the lattice structure 110. In the embodiment of FIGS. 1-6, the upper shelf 118 extends only around the perimeter of the lattice structure 110 without extending into the center of the lattice structure. In this embodiment, the upper shelf 118 has a width between 3 mm and 30 mm at various locations along the upper shelf 118. For example, the width of the upper shelf 118 near the heel region is about 26 mm, while the width of the upper shelf 118 near the toe region is about 7 mm. The smooth and continuous surface of the upper shelf 118 is contoured to match that of the lower surface perimeter of the resilient insert 150. Accordingly, the resilient insert 150 is configured to receive and closely engage the upper shelf 118, and the lattice structure 110, providing a convenient location for securing the resilient insert 150 and/or the upper 102 to the lattice structure 110. At the same time, the lattice structure 110, including the upper shelf 118 is configured to support the resilient insert 150 and/or the upper 102 within the article of footwear 100.

The upper shelf 118 generally provides the highest portion of the lattice structure 110. The upper shelf 118 extends around the upper perimeter of the lattice structure 110 but does not completely cover the network of laths 114 and nodes 116. However, in various alternative embodiments, the upper shelf 118 may be configured as a platform that extends completely across the lattice structure 110 to completely cover the network of laths 114 and nodes 116.

As shown in FIGS. 3 and 4, a recess 108 is formed in the lattice structure 110 which extends downward from the upper shelf 118 and into the network of laths 114 and nodes 116. In the embodiment of FIGS. 3 and 4 this recess 108 extends completely across the lattice structure 110 from a forefoot region 130 to a heel region 140 of the midsole 104, but only extends partially downward into the network of laths 114. However, in other embodiments, such as the embodiment of FIGS. 7-8 described in further detail below, the recess 108 extends across only a portion of the foot of the wearer, such as across a portion of the forefoot region 130 or a portion of the heel region 140. In addition, the recess 108 may also extend downward to a greater degree than the embodiment of FIGS. 3 and 4. For example, in the embodiment of FIGS. 7-8 the recess extends completely through the lattice structure 110. Accordingly, it will be recognized that the recess 108 may be provided in any of various shapes and dimensions, and is typically configured to receive and retain the resilient insert 150 within the midsole 104. Additionally, it will be recognized that one or more recesses 108 may be provided in each lattice structure 110, with each recess 108 configured to receive a resilient insert 150.

Figure 5:
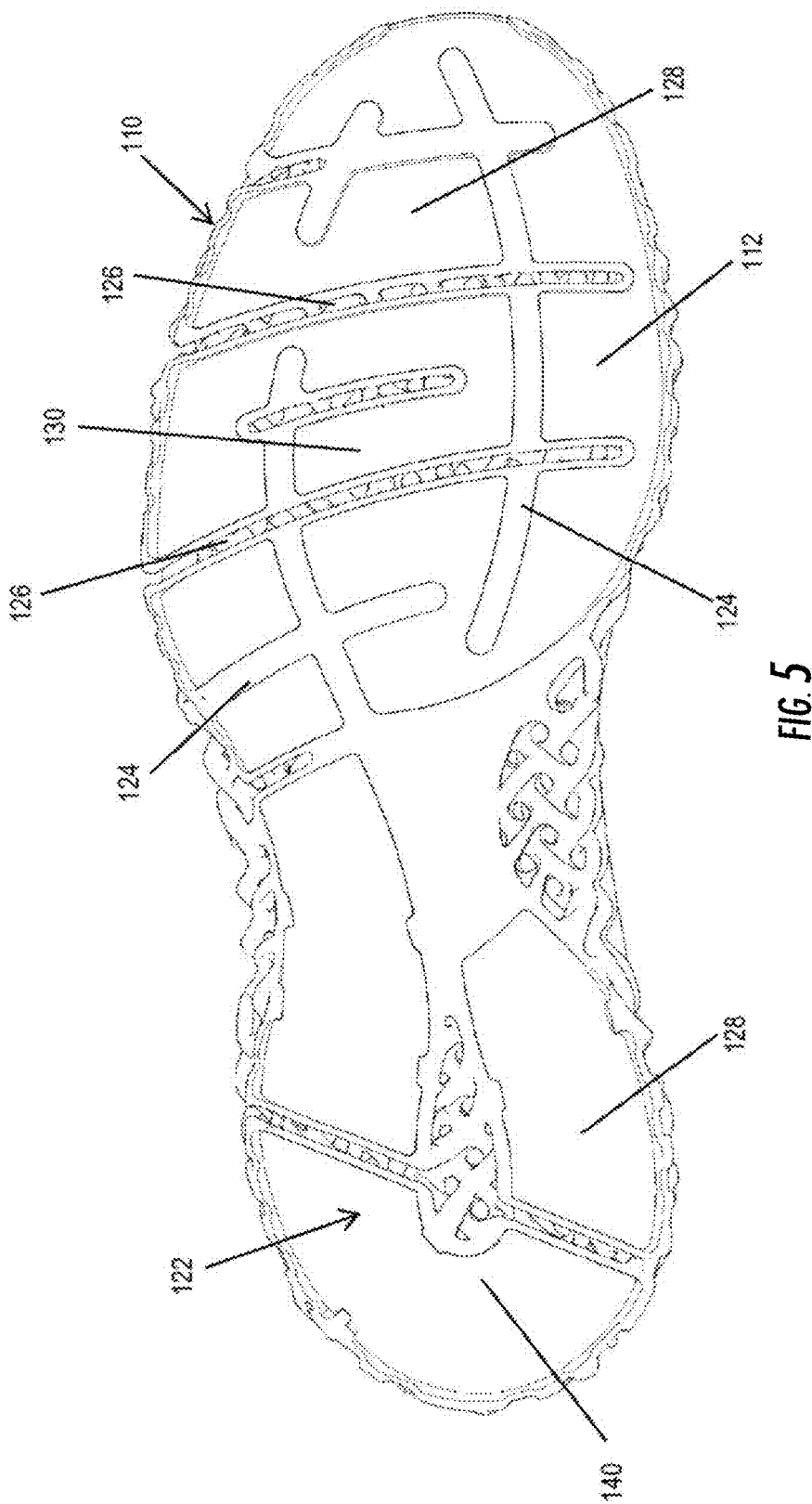
FIG. 5 is a bottom view of the lattice structure of FIG. 2.

With particular reference now to FIG. 5, the lower platform 112 of the lattice structure 110 is provided on the opposite side of the lattice structure 110 from the upper shelf 118. The lower platform 112 provides the general footprint or outline shape for the bottom of the article of footwear 100. The lower platform 112 includes an upward-facing surface which is connected to the network of laths 114 and a downward-facing surface 122 which engages the outsole 106. The downward-facing surface 122 is substantially flat and smooth and includes a plurality of ribs 124 and a plurality of grooves 126. The plurality of ribs 124 extend outward from the surrounding portions of the downward-facing surface 122. The plurality of grooves 126 may cut completely through the lower platform 112 and into the recess 108 or the laths 114 of the lattice structure 110. The ribs 124 and grooves 126 may be advantageously arranged in any of various configurations with the ribs 124 offering additional support and stability for the midsole 104, and the grooves offering additional flexibility for the midsole 104. Relatively flat and smooth sections 128 are provided between the ribs 124 and grooves 126. As described in further detail below, outsole pads 160 are connected to each of the relatively flat and smooth sections 128 of the lattice structure 110.

The lattice structure 110 may be comprised of any of various materials. In at least one embodiment, the lattice structure 110 is comprised of a polymer, such as nylon, PTFE or any of various other thermoplastic polymers. The polymers used to form the lattice structure 110 may be advantageously appropriate for use in association with various three dimensional (3D) printing processes, such as selective laser sintering, fused deposition modeling, or related 3D printing processes. In addition to being a material appropriate for use with 3D printing processes, the material used for the lattice structure 110 should also provide the appropriate qualities desired for the midsole such as strength and resiliency. Use of the appropriate material for the lattice structure 110 will allow the lattice structure 110 to provide good stability and energy return for the midsole 104. In the embodiment of FIGS. 1-6, the lattice structure 110 is a unitary component with the lower platform 112, laths 114, nodes 116, and upper shelf 118 all integrally formed together during a 3D printing process. Because the lattice structure 110 is formed by 3D printing, the various components of the lattice structure, including the lower platform 112, laths 114 and upper shelf 118 may be integrally formed without gate marks, sprue marks, parting line marks and ejector pin marks as are common with molded parts.

Multi-Component Midsole

With reference again to FIGS. 2-3, in at least one embodiment, the midsole 104 is formed of two components, including the lattice structure 110, as described above, and a resilient insert 150. The resilient insert 150 is positioned upon and at least partially within the lattice structure 110. The resilient insert 150 is generally provided as a unitary panel or block-like component that is inserted into the recess 108 of the lattice structure 110. The resilient insert 150 may be provided in any of various shapes and sizes. For example, in the embodiment of FIGS. 2-3, the insert is a relatively thin panel that is provided in the general shape of a footprint. In this embodiment, the resilient insert 150 includes a perimeter edge 152 and a foot bed 154 with a relatively flat and smooth upper surface 156 extending from side-to-side of the perimeter edge. The foot bed 154 is slightly depressed relative to the perimeter edge 152 such that the foot bed 154 rests slightly downward from the perimeter edge 152. The perimeter edge 152 of the resilient insert 150 is configured to abut the upper shelf 118 of the lattice structure 110. The foot bed 154 is configured to rest within the recess 108 of the lattice structure 110 with a lower surface of the resilient insert engaging the laths 114 and nodes 116 or the lower platform. An adhesive or other connecting means may be used to secure the resilient insert 150 in place within the lattice structure 110.

While the resilient insert 150 has been described in the embodiment of FIGS. 2-3 as having a size and shape that extends substantially over the entirety of the lattice structure 110, in other embodiments the resilient insert 150 may have a different shape or may have more of a block-like structure. In any event, the resilient insert 150 is generally configured to provide any of various cushioning, energy return, support or other qualities in the region of the midsole 104 associated with the resilient insert 150.

In addition to having various sizes and shapes, the resilient insert 150 may also be positioned in various locations within the lattice structure 110. For example, in the embodiment of FIGS. 2-3, the resilient insert 150 extends across and covers the lattice structure 110. In this embodiment the resilient insert 150 may be designed to cooperate with the network of laths 114 and provide a generally soft yet resilient cushioning component for the foot of the wearer. In other embodiments, the resilient insert 150 may only be positioned in one limited area of the lattice structure 110, such as the heel region 140 or the forefoot region 130 of the midsole 104. In these embodiments, the resilient insert 150 is configured to provide additional support or cushioning in only the targeted area where the resilient insert 150 is located. In yet other embodiments, several resilient inserts may be provided in different regions of the midsole 104, such as one resilient insert 150 in each of the forefoot region and the heel region, or such as two separate inserts in the heel region.

In at least some embodiments, the resilient insert 150 is designed and dimensioned to fill the entire void provided by the recess 108. The resilient insert 150 abuts the lattice structure 110 such that the resilient insert 150 is held securely in place within the recess 108. Accordingly, the portion of the resilient insert 150 that is to fill the recess 108 is typically includes dimensions that are similar to the dimensions of the recess 108. However, in at least some embodiments, the portion of the resilient insert 150 that is inserted into the recess 108 may be dimensioned significantly different than that of the recess such that voids remain in the recess 108 even when the resilient insert 150 is positioned therein.

The resilient insert 150 may be comprised of any of various materials adapted to provide the desired cushioning, energy return, or support needs in the area associated with the insert. In at least one embodiment, the resilient insert 150 may be comprised of ethylene-vinyl acetate (EVA) or other elastomeric polymer material that is relatively soft and resilient. For example, the resilient insert 150 may be comprised of EVA foam that is generally lightweight and provides a desired degree of cushioning and resiliency for the resilient insert 150. The insert may be formed by molding or die-cutting the EVA foam into a desired shape. After the resilient insert 150 is formed, it is placed in the recess 108 of the lattice structure 110 where it is securely retained to complete the midsole 104.

Figure 7:
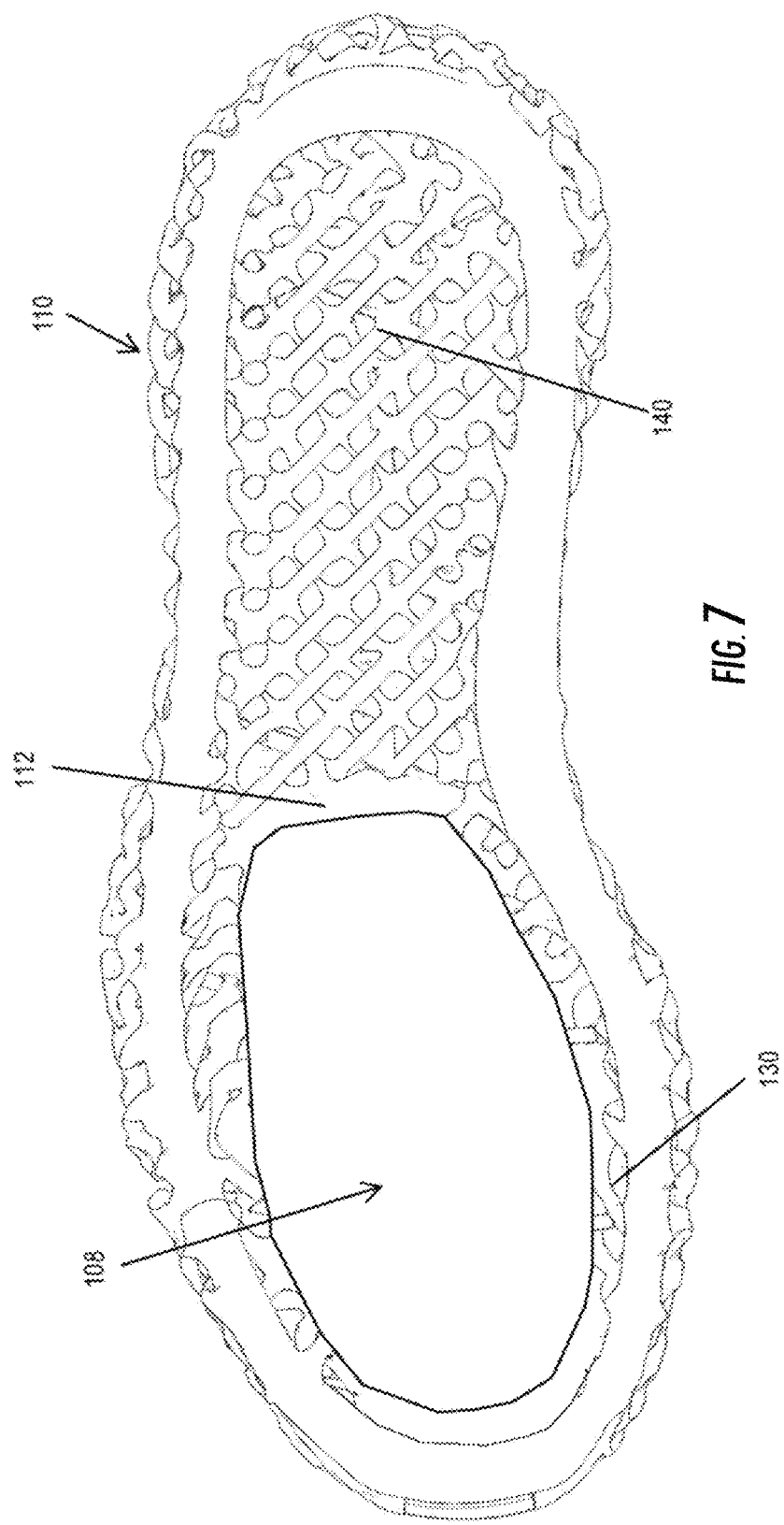
FIG. 7 is a top view of an alternative embodiment of the midsole lattice structure of FIG. 2 including a recess that extends completely through the lattice structure in a forefoot region of the midsole.
Figure 8:
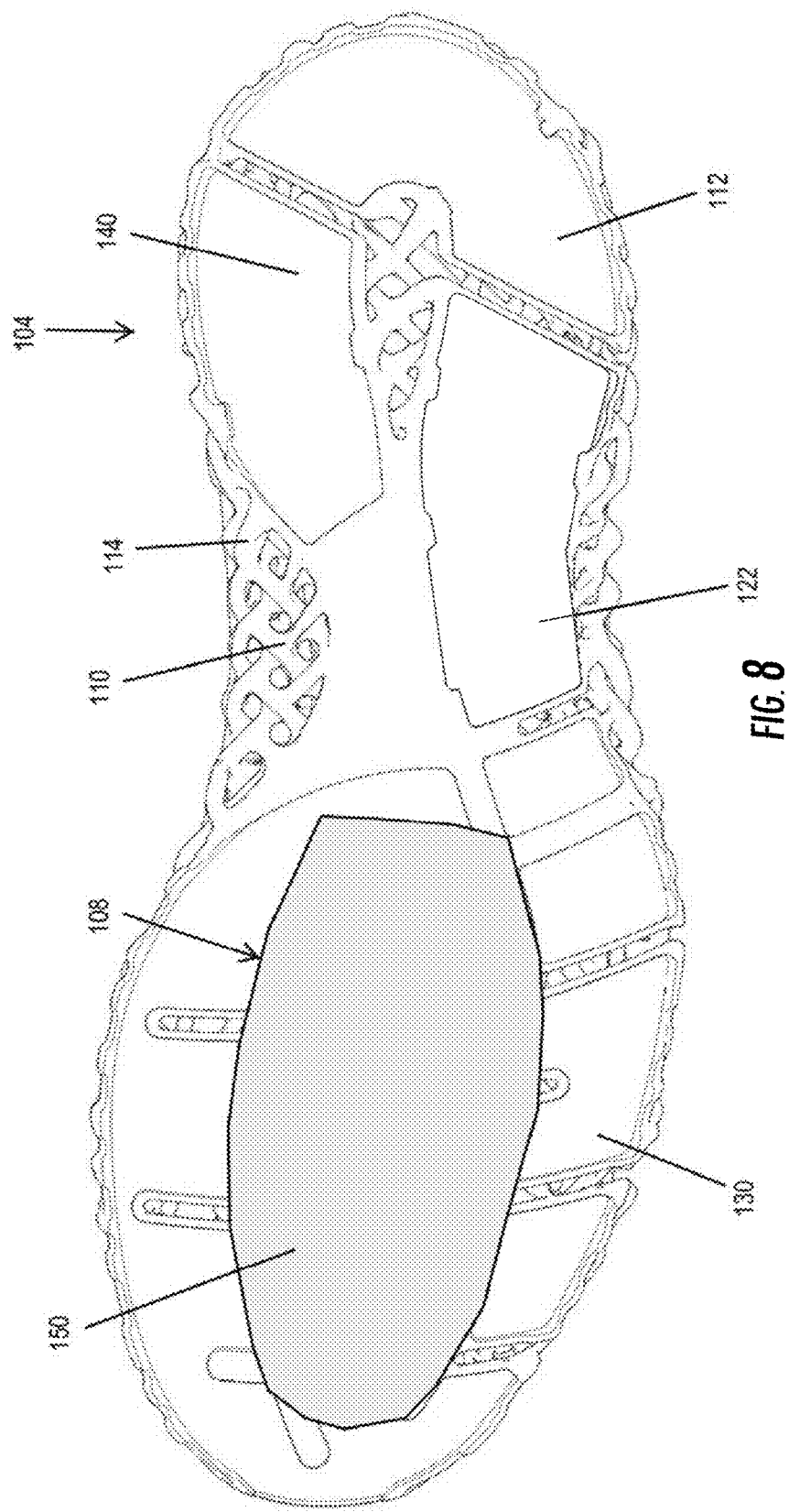
FIG. 8 is a bottom view of the lattice structure of FIG. 7 with a resilient insert positioned in the recess.

As noted previously, it will be recognized that the lattice structure 110 and the resilient insert 150 may be provided on the midsole 104 in any of various designs and configurations. With reference now to FIGS. 7 and 8, in at least one embodiment, the lattice structure 110 spans the length of the midsole from end-to-end, but the resilient insert 150 is provided in only one region of the midsole 104. For example, in the embodiment of FIGS. 7 and 8, the resilient insert 150 is only provided within the forefoot region 130 of the midsole. In this embodiment, the recess 108 extends the complete height of the midsole 104, extending upward completely through the lower platform 112 and the network of laths 114 and nodes 116. As shown in FIG. 7, a relatively large direct passage through the lattice structure 110 is provided by the recess 108. As shown in FIG. 8, when the resilient insert 150 is positioned in the recess 108, the resilient insert 150 is exposed on the downward facing surface 122 of the lower platform 112. In this embodiment, the recess 108 in the lattice structure 110 may or may not extend to other parts of the midsole 104, such as the heel region 140. If the recess 108 does extend to other parts of the lattice structure one or more additional resilient inserts 150 may be positioned within those additional portions of the lattice structure 110.

Figure 9:
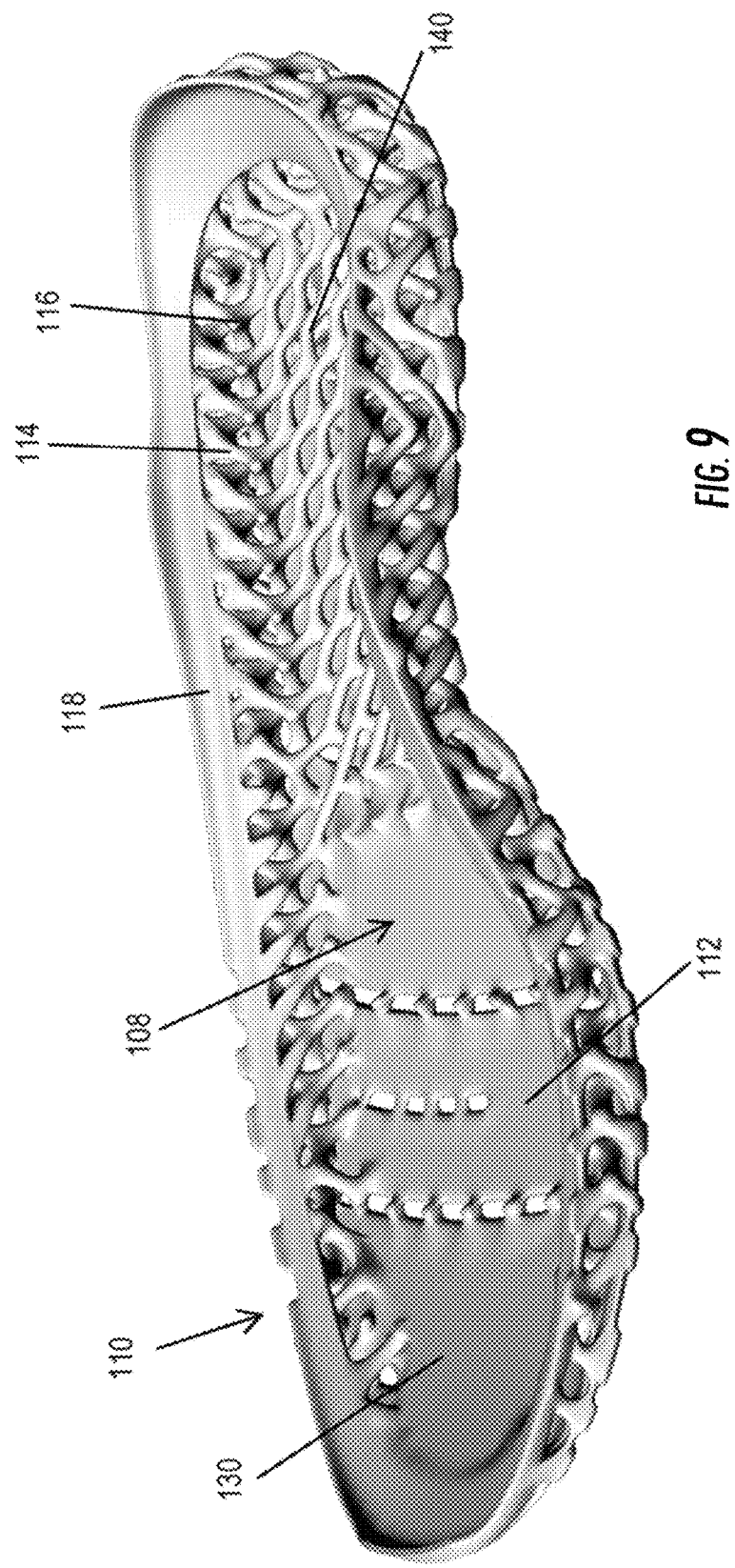
FIG. 9 is a side perspective view of a section of an alternative embodiment of the midsole lattice structure of FIG. 7 wherein the recess extends to a lower platform of the lattice structure.

With reference now to FIG. 9, an alternative embodiment of the lattice structure of FIGS. 7-8 is shown. In this embodiment of FIG. 9, the recess 108 does not extend completely through the height of the lattice structure 110, but only extends down to the lower platform 112 in the forefoot region 130. The recess 108 also extends downward in the heel region 140, but does not extend to the lower platform 112, and instead only extends downward into the network of laths 114, lower than the upper shelf 118. Slits are formed in the lower platform 112 which provide additional flexibility for the forefoot region 130 of the midsole. While the resilient insert 150 is not shown in FIG. 9, it will be recognized that the resilient insert 150 may be provided in any of various forms and configurations. For example, the resilient insert 150 may be provided as a single piece that rests in the recess 108 of FIG. 9 while also extending from the forefoot region 130 to the heel region 140. In this example, the resilient insert 150 may be substantially thicker in the forefoot region 130 than in the heel region 140 since the recess 108 is deeper in the forefoot region 130 than in the heel region 140. As another example, the resilient insert 150 may be a single block-like piece that only rests in the recess 108 in the forefoot region only.

Figure 10:
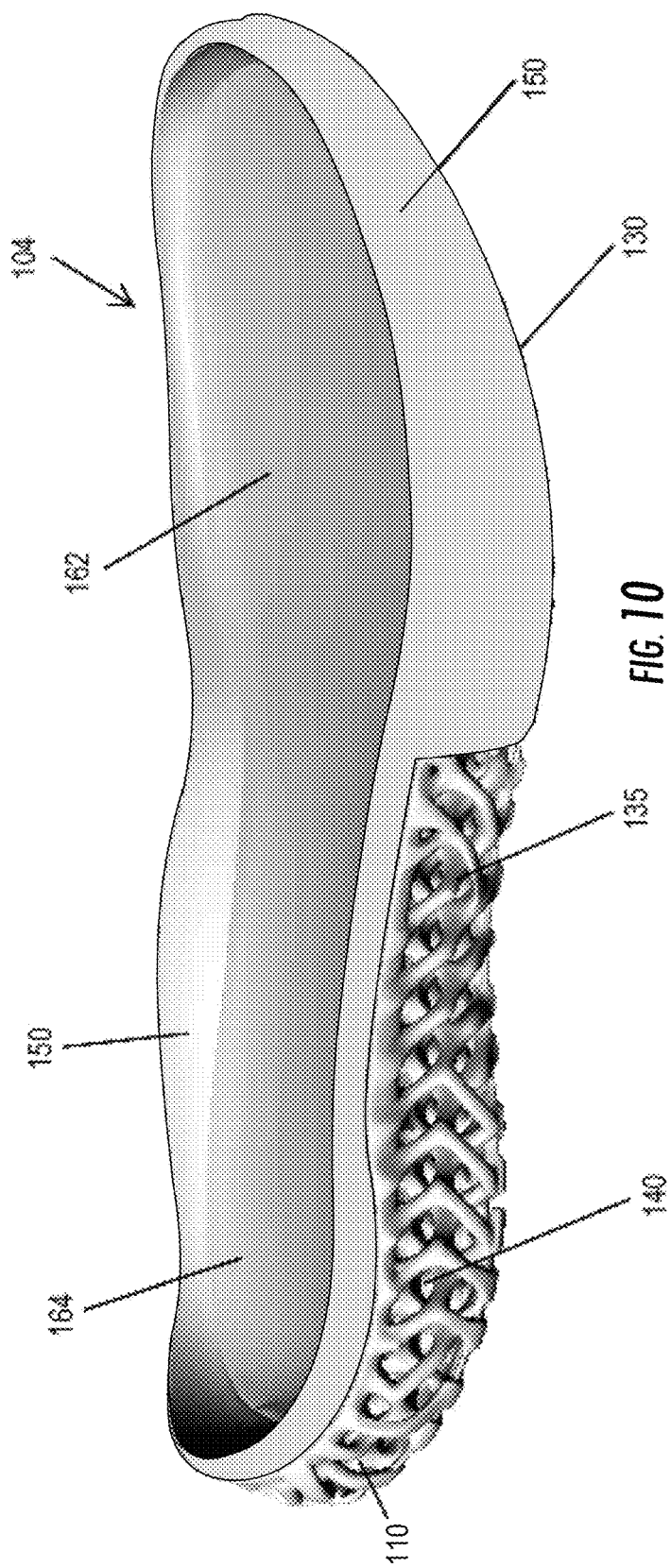
FIG. 10 is an alternative embodiment of the lattice structure of FIG. 2 wherein the lattice structure extends from a heel region to a midfoot region of the midsole, but does not extend to a forefoot region.

With reference now to FIG. 10, yet another exemplary embodiment of a midsole 104 is shown. In this embodiment, the lattice structure 110 does not extend across the entire midsole from the forefoot region 130 to the heel region 140. Instead, the lattice structure 110 extends only across a limited region of the midsole 104. In particular, as shown in FIG. 10, the lattice structure 110 is only provided on the rear half of the midsole 104, extending across the entire heel region 140 but terminating in a midfoot region 135 without extending into the forefoot region 130. In this embodiment, the front portion (e.g., the front half) of the midsole 104 may be provided by another material such as EVA foam or other material. Accordingly, the front portion of the midsole 104 may be considered to be an extension of the insert 150, which also extends to the heel portion 164 of the midsole 104. In such an embodiment, the heel portion 164 of the insert 150 is integrally formed with the forefoot portion 162 of the insert 150. The heel portion 164 may be a relatively flat panel that engages the lattice structure 110, as shown in FIG. 10, while the forefoot portion 162 of the insert 150 may be more block-like and provide the entirety of the midsole 104 in the forefoot region 130. Accordingly, the heel region 140 of the midsole 104 will provide the performance qualities consistent with the combined lattice structure 110 and resilient insert 150, while the forefoot region 130 of the midsole 104 will provide performance qualities consistent with that of the resilient insert alone. While FIG. 10 illustrates one exemplary embodiment of an arrangement of the midsole 104 with the lattice structure 110 and the resilient insert 150 provided in different portions of the midsole 104, it will be appreciated that numerous other arrangements are possible, including the lattice structure 110 only in a front portion, a lateral side, a medial side, or a central region of the midsole 104. In each of these embodiments, other materials, such as the EVA foam of the resilient insert 150 may be provided in the remaining portions of the midsole 104. In yet other embodiments, two or more distinct regions may be covered by the lattice structure, such as the forefoot region 130 and the heel region 140, with the region in-between (i.e., the midfoot region 135) covered by the resilient insert.

As described above, a two part midsole including a lattice structure and resilient insert may configured in various ways to allow for targeted features in different zones of a midsole. It will be appreciated that the performance qualities of the midsole may be adjusted as desired based on the arrangement and configuration of the lattice structure and the associated placement of the resilient insert. Additionally, performance qualities of the midsole may also be adjusted by different configurations in the lattice structure itself or different configurations in the resilient insert.

Wave-Like Lattice Construction

Figure 11:
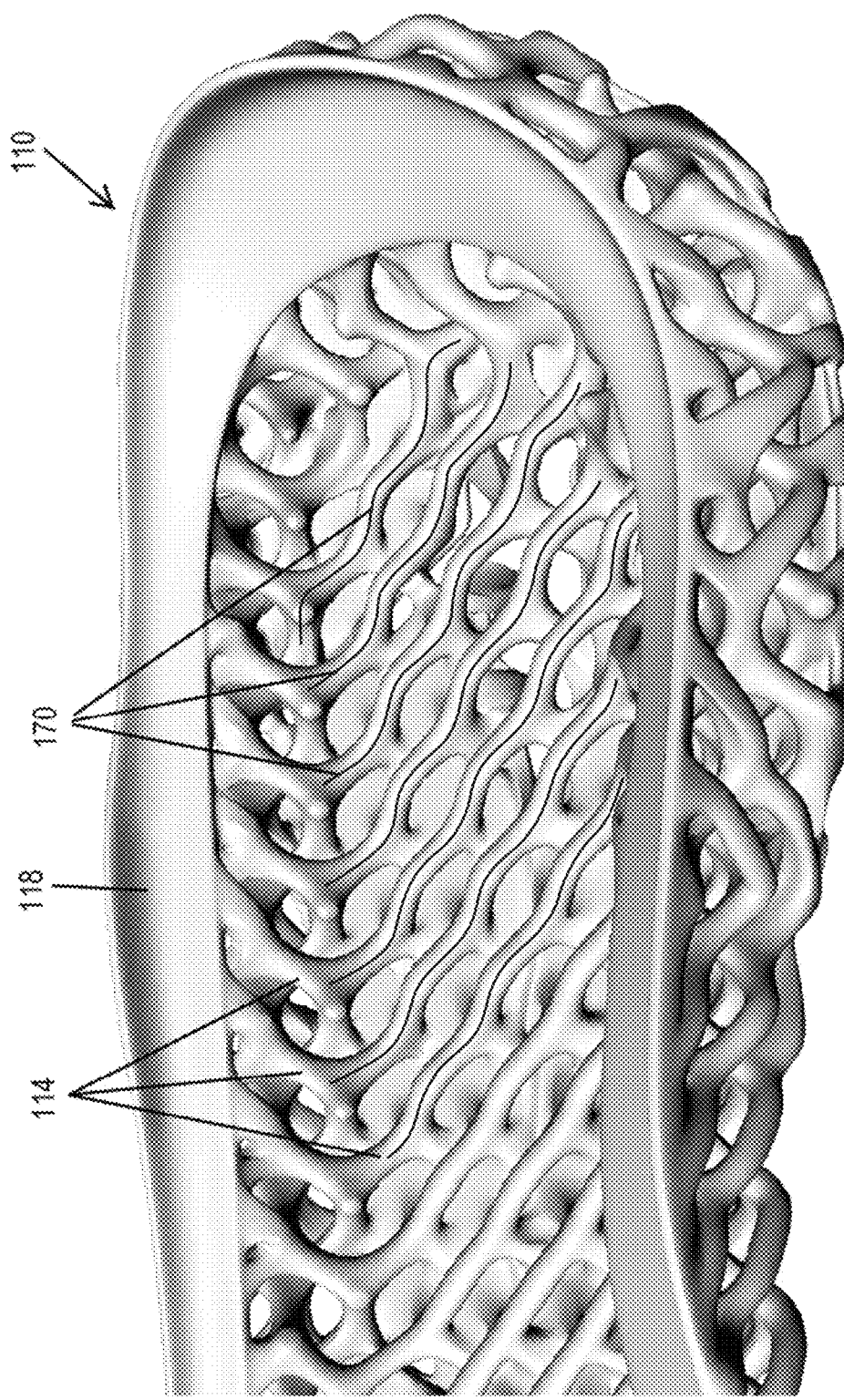
FIG. 11 is a perspective view of a midsole lattice structure with lines illustrating the wave-like structure of the parallel laths in a first layer of the lattice structure.

In the embodiments of FIGS. 1-10, the laths 114 are provided as wave-like structures that are arranged in alternating layers. Each lath is generally cylindrical with a circular cross-section such that the girth of a lath may be calculated as being equal to 2×π×r, where r is the radius of the circular cross-section of the lath. FIG. 11 illustrates the wave-like structure of the laths 114 with lines 170. Each of the laths 114 is provided in a single layer of the lattice structure. The wave-like structure of the laths 114 is generally sinusoidal. Also, the laths 114 are all substantially parallel to one another in the illustrated layer.

Figure 12:
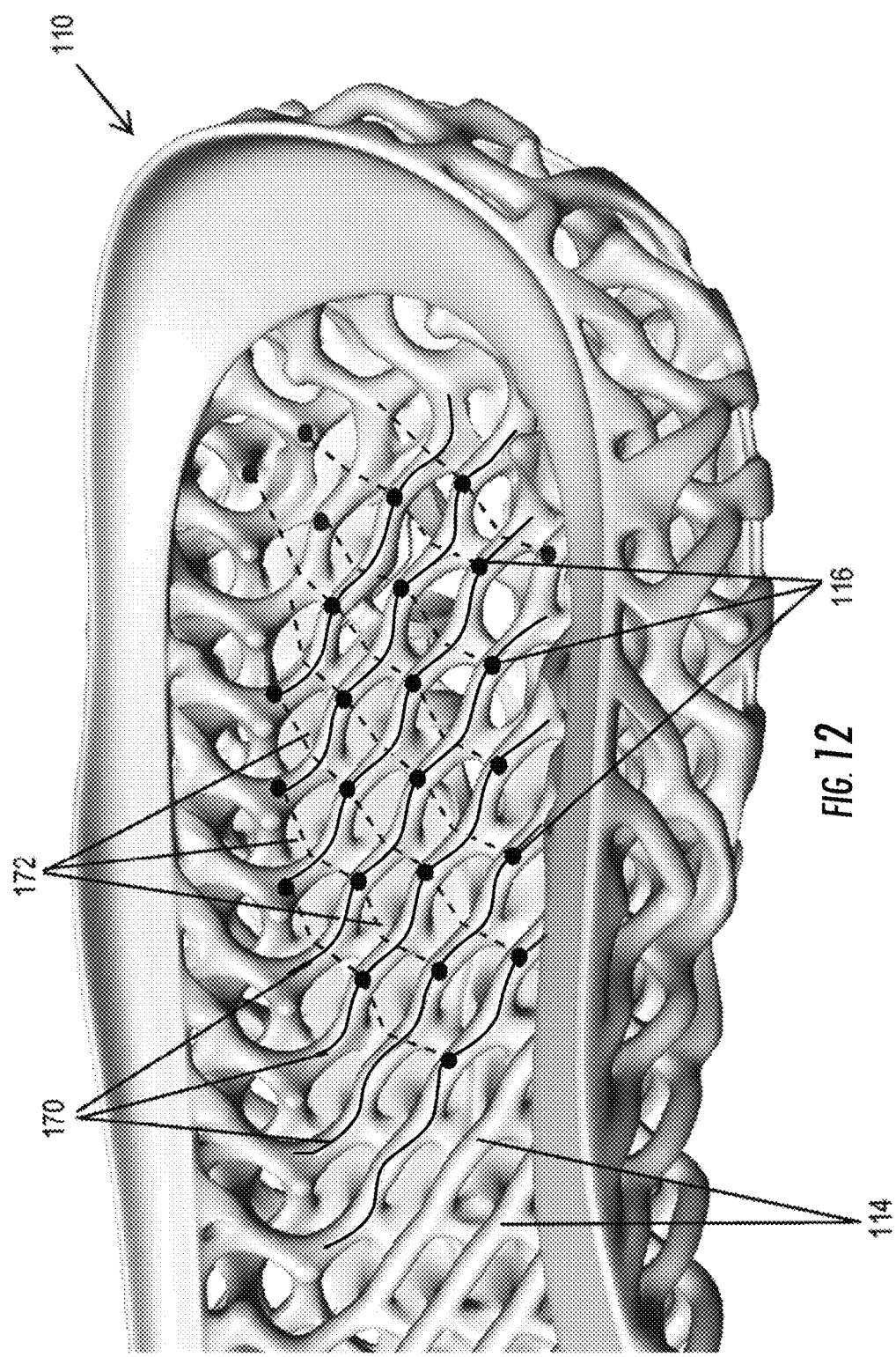
FIG. 12 is a perspective view of the midsole lattice structure of FIG. 11 with dotted lines illustrating the wave-like structure of the parallel laths in a second layer of the lattice structure that is above the first layer.

FIG. 12 illustrates the arrangement of a second layer of laths 114 with dotted lines 172 extending over the lines 170 (which represent the laths of the first layer). It will be recognized the laths of the second layer of the lattice structure 110 are not shown in FIG. 12 for clarity, but the laths of the second layer follow the pattern of the dotted lines 172. The laths of the second layer are provided on top of the laths of the first layer. Similar to the laths of the first layer, the laths of the second layer are also parallel to each other. However, as can be seen by comparing lines 170 and dotted lines 172, the laths of the second layer are oriented in a transverse direction to the laths 114 of the first layer. In at least one embodiment, the laths of the first layer are oriented about ninety degrees (90°) relative to the laths of the second layer. As shown in FIG. 12, nodes 116 are formed where the laths 114 of the first layer contact the laths of the second layer. The nodes 116 may therefore be considered to be locations wherein the laths of one layer intersect and conjoin with the laths of another layer. In the embodiment of FIG. 12, the nodes are provided at locations where the peaks of the wave-like laths from a lower layer engage the valleys of the wave-like laths from an upper layer. As will be recognized, the lattice structure 110 may include any number of vertically stacked layers and the laths 114 in each alternating layer are transverse to each other.

Lattice with Hollow Tubes

Figure 13:
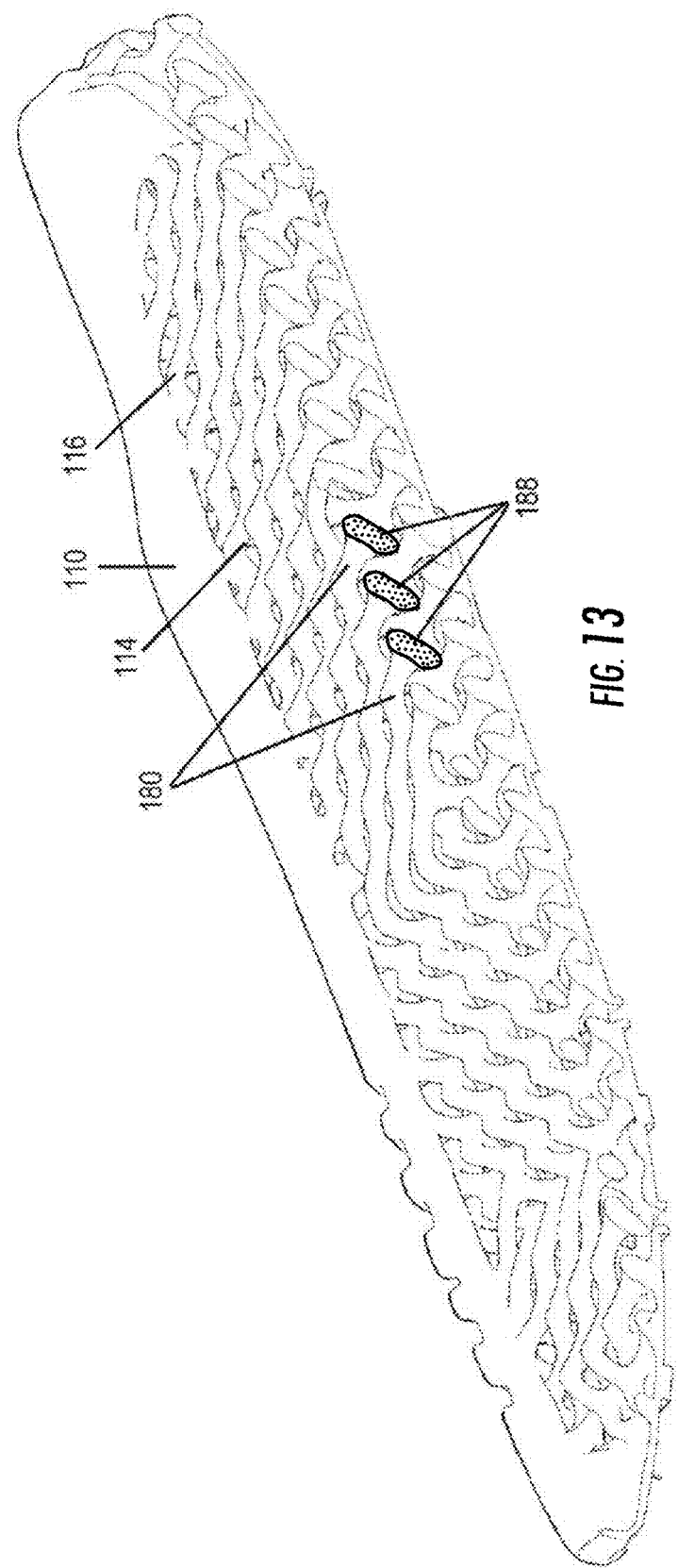
FIG. 13 is a perspective view of an alternative embodiment of the midsole lattice structure of FIG. 9 with a cutaway portion to expose hollow laths of the lattice structure with loose powder retained within the hollow laths.

With reference now to FIG. 13, in at least one embodiment, the laths 114 of the lattice structure 110 are provided as hollow tubular structures 180 joined together at the nodes 116. FIG. 13 shows a portion of the midsole 104 cut away to expose inner voids in the form of channels 188 defined within the hollow tubular structures 180.

Figure 14A:
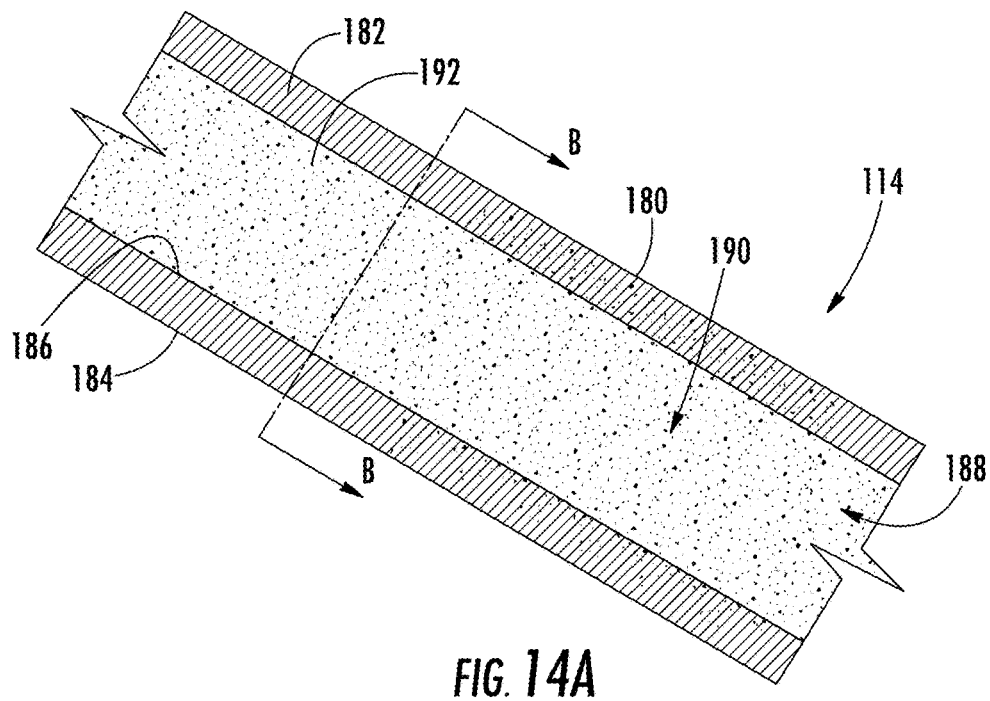
FIG. 14A is a longitudinal cross-sectional view of a lath of the lattice structure of FIG. 13.
Figure 14B:
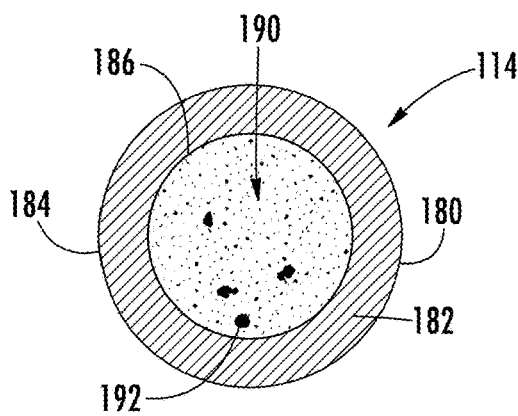
FIG. 14B is a cross-sectional view of the lath of FIG. 14A along line B-B of FIG. 14A.

FIGS. 14A-14B show a detailed view of the hollow tubular structures 180 of FIG. 13. In the embodiment of FIGS. 14A-14B, each hollow tubular structure 180 is provided as generally cylindrical member including a cylindrical wall 182 with an outer surface 184 and an inner surface 186. The inner surface 186 defines the channel 188 extending through the hollow tubular structure 180. While the tubular structure 180 is shown in FIGS. 14A and 14B as having a generally cylindrical form with a circular cross-section, it will be recognized that other shapes are possible for the tubular structures 180. For example, as explained in further detail below the tubular structures 180 may be provided as having any of various cross-sectional shapes, or the diameter of the inner surface 186 or the outer surface 184 may vary significantly across the length of a single tubular structure 180.

With continued reference to FIGS. 14A and 14B, the hollow tubular structures 180 are filled with a loose granular material 190. The loose granular material 190 includes numerous particles 192 that are not sintered or otherwise fused together. The loose granular material 190 is contained within the tubular structures 180 such that the individual particles 192 cannot escape from the lattice structure 110 unless there is a breach in the lattice structure 110 (e.g., the particles 192 are trapped within the tubular structures 180 unless there is some damage to the lattice structure 110 that results in an opening in the laths 114 or nodes 116 allowing the particles 192 to escape).

In at least one embodiment, the loose granular material 190 is the same material used to form the lattice structure 110 during a 3D printing process. For example, the loose granular material 190 may comprise nylon, PTFE or any of various other thermoplastic polymers or other polymer material which is the same as the material used to form the tubular structures 180. However, it will be recognized that in other embodiments, the loose granular material 190 may be a different material than the material used to form the lattice structure 110.

As explained in further detail below, during the 3D printing process, granular material is deposited onto a layer such that a solid lath may be formed if all of the granular material is sintered together. However, during the sintering process for a given layer, the sintering device only sinters the wall 182 of the hollow tubular structure 180. The granular material positioned within the wall 182 is not sintered or otherwise fused together, leaving loose granular material within the center of the wall 182 for that layer. This process is repeated over multiple layers until a complete hollow tubular structure 180 is formed with loose granular material remaining trapped within the channel 188 of the hollow tubular structure 180. After the lattice structure 110 is completed each lath formed as a hollow tubular structure 180 is filled with loose granular material 190. Advantageously, if the loose granular material 190 is the same material used to form the tubular structures 180, there is no need to deposit different types of material onto the component build during the 3D printing process. However, in those embodiments where the loose granular material is different from the material used for the lattice structure 110, an additional print head or other deposition device may be used to incorporate the loose granular material into the tubular structures 180.

Because the loose granular material 190 is not sintered or otherwise fused together, each particle 192 is free to move relative to the other particles in the tubular structure 180. As a result, when the lattice structure 110 is moved sufficiently to cause the particles 192 to shift and intermingle, the particles 192 become mixed up and jumbled relative to a previous position of the particles prior to the lattice structure being moved.

In those embodiments where the loose granular material 190 is deposited into the channels 188 in association with a 3D printing process, the loose granular material 190 may be provided in the form of a powder (e.g., a nylon powder). In at least one exemplary embodiment, the particles 192 of the loose granular material 190 are substantially spherical in shape with each particle between 10 microns and 100 microns in diameter. Smaller particles will generally result in a greater density of particles in the channel and larger particles will generally result in a lesser density of particles in the channel. In any event, the particles 192 will tend to settle in the channels 188 over time and with use of the lattice structure 110 within the midsole 104.

FIG. 14B shows a cross-sectional view of the tubular structure 180 immediately after formation of the lattice structure 110. At this time, the loose granular material 190 substantially fills the channel 188, from top to bottom, with the loose granular material 190 only lightly packed within the channel 188. At this time, numerous and relatively large air pockets exist between the particles 192. These air pockets may be referred to herein as "negative space" because this space within the tubular structure 180 is void and does not contain any of the loose granular material. The negative space within the tubular structure 180 may also be beneficial and act as a dampening agent within the lattice structure 110.

Figure 14C:
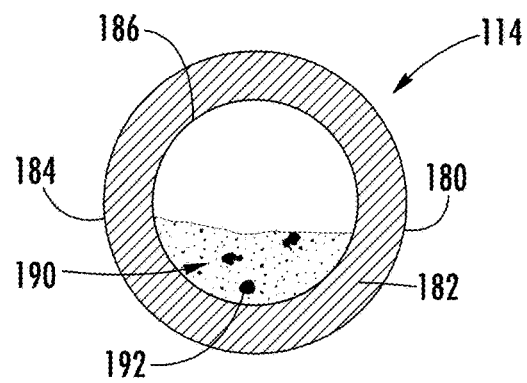
FIG. 14C is the cross-sectional view of FIG. 14B showing settling of the loose granular material after the midsole has been incorporated into an article of footwear and the article of footwear has been in use.

FIG. 14 C shows a cross-sectional view of the tubular structure 180 after the lattice structure 110 has been in use for some time (e.g., a month) within the midsole 104 of a shoe. As shown in FIG. 14C, at this time, the loose granular material 190 has become more tightly packed and only fills a portion of the channel 188 (i.e., does not exist in the entire space from the top to the bottom of the channel). For example, as shown in FIG. 14C, the loose granular material 190 may only fill about fifty percent (50%) of the channel 188, with no loose granular material in the upper half of the channel 188. After some time, the loose granular material 190 will tend to reach a steady-state condition where the loose granular material 190 is substantially settled within the channel 188. This steady-state condition may vary depending on a number of factors, including the type of material, the size and shape of the particles 192, and the original density of the loose granular material 190 within the channel 188, the size and shape of the channels 188, and various other factors. In at least one embodiment, the loose granular material 190 may reach a steady-state condition when it fills between about 25% and 75% of space within the tubular structures. Even when the particles reach this more tightly-packed, steady state condition, the granular material is still considered to be "loose" granular material because the particles 192 are not sintered or otherwise fused within the channel 188 and may be dispersed within the channel 188 by an appropriate level of movement or force acting upon the particles.

In at least one embodiment, the density of particles 192 deposited within the hollow tubular structure 180 during a 3D printing process may be based on a predetermined desired steady-state condition for the loose granular materials 190. For example, it may be determined that a particular midsole 104 provides desired performance features when the loose granular material fills 50% of the tubular structures 180. In this case, the manufacturer may determine a density at which the loose granular materials should be applied during the 3D printing process so that this 50% fill is eventually achieved once the midsole 104 is in use and the particles 192 reach the steady-state condition. Additionally, in order to achieve this desired condition at the time of sale of the article of footwear containing the midsole 104, the manufacturer may process each midsole prior to sale. For example, the midsole may be processed by vibrating the midsole in order to compress the loose granular material 190 within the hollow tubular structures 180 prior to sale of the midsole 104. As a result, when the article of footwear is sold, the midsole 104 will already include loose granular material 190 that fills 50% of the tubular structures and provides the desired performance qualities for the midsole.

The tubular structures 180 with loose granular material 190 may be provided in any of various forms and designs. In the embodiment of FIGS. 14A-14B, both the outer surface 184 and the inner surface 186 of the hollow tubular structure 180 have of a uniform diameter with a circular cross-section. However, in other embodiments, the configuration of the tubular structure 180 may vary. For example, instead of a circular cross-section, the tubular structure 180 may be provided as a triangular, square, or any other polygonal shape. As another example, either or both of the outer surface 184 or the inner surface 186 may vary in diameter.

Figure 15:
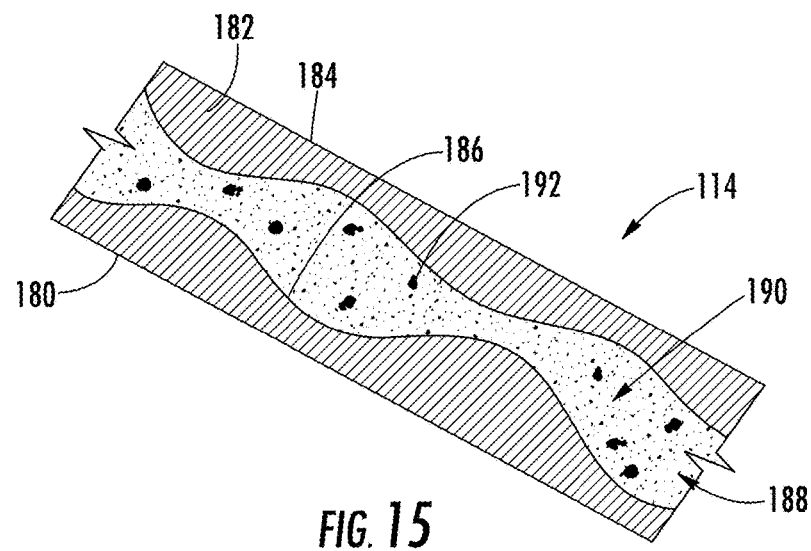
FIG. 15 is a longitudinal cross-sectional view of an alternative embodiment of a lath of the lattice structure of FIG. 13 wherein the inside diameter of the hollow lath is variable.

FIG. 15 shows an exemplary embodiment of the hollow tubular structure 180 wherein the outer surface 184 is uniform, but the inner surface 186 that defines the channel 188 varies over the length of the channel. This configuration where the inner diameter of the channel 188 varies may be advantageous in encouraging particles 192 to remain within defined sections of the hollow tubular structure 180 and may therefore encourage more consistent performance qualities over time with extended use of the midsole 104. This configuration may also be advantageous in allowing the manufacturer to fine-tune performance qualities for the midsole. For example, it may be determined that a lattice structure 110 that includes a plurality of hollow tubular structures 180 with varying diameters on the inner surface 186 are more resilient or otherwise provide advantageous performance qualities. Additionally, it will be recognized that the lattice structure 110 may be tuned such that one hollow tubular structure 180 has a first inner or outer diameter in a first region or zone of the midsole 104, and another hollow tubular structure 180 has a different second inner or outer diameter in a second region or zone of the midsole, thereby allowing different regions or zones of the midsole 104 to provide different performance qualities.

Figure 16:
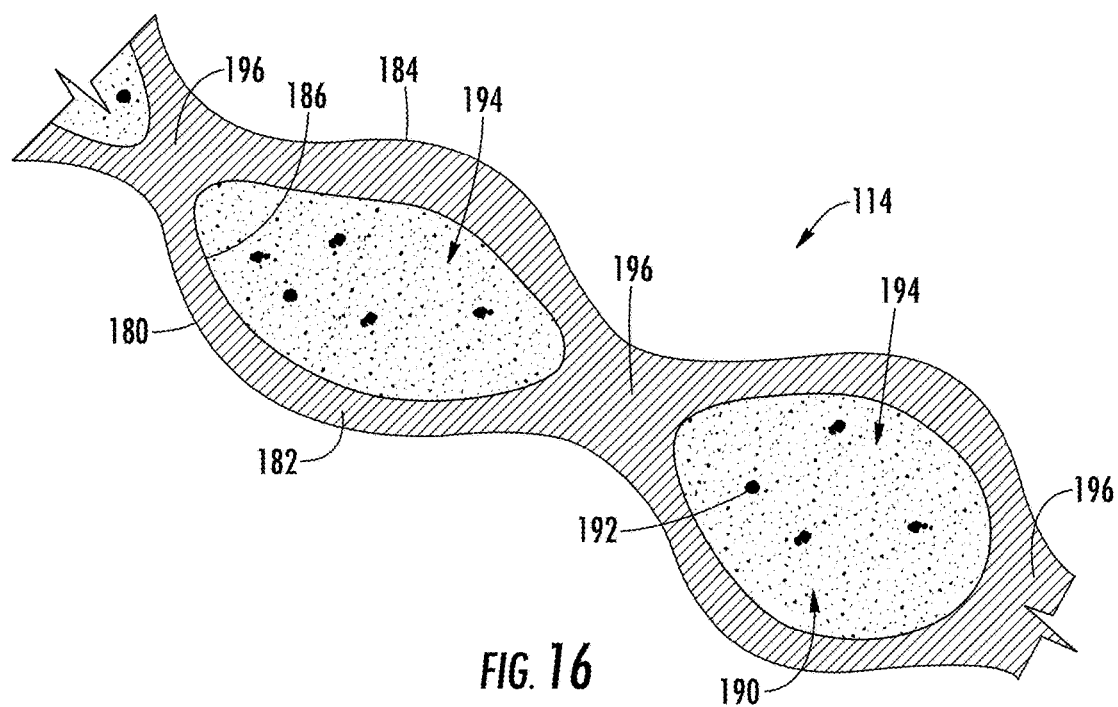
FIG. 16 is a longitudinal cross-sectional view of an alternative embodiment of a lath of the lattice structure of FIG. 13 wherein the outside diameter of the hollow lath is variable.

FIG. 16 shows an alternative embodiment of a lath 114 of the lattice structure 110 wherein the inner surface 186 and the outer surface 184 of the hollow tubular structure 180 are of varying diameter. In the embodiment of FIG. 16, the diameter of the inner surface 186 varies to the extent that the inner diameter is closed along certain longitudinal stretches of the tubular structure 180. Accordingly, distinct pockets 194 are formed at different locations along the tubular structure 180 with solid regions 196 formed between the pockets 194. The tubular structure 180 may be considered hollow in regions where the pockets 194 are formed and solid in regions 196 where there are no pockets 194. Advantageously, in the embodiment of FIG. 16, the particles 192 are sealed within the pockets 194 and therefore the particles are prevented from migrating within the lattice structure 110. Instead, the particles 192 provided within a pocket at the time of manufacture are maintained within that pocket 194 during use. While the particles 192 may move, settle and pack within each pocket 194, the particles 192 are prevented from migrating to other regions or pockets outside of their dedicated pocket 194. Accordingly, the performance qualities of the midsole may be controlled to a greater extent through the use of pockets 194 within the tubular structure 180.

Figure 17A:
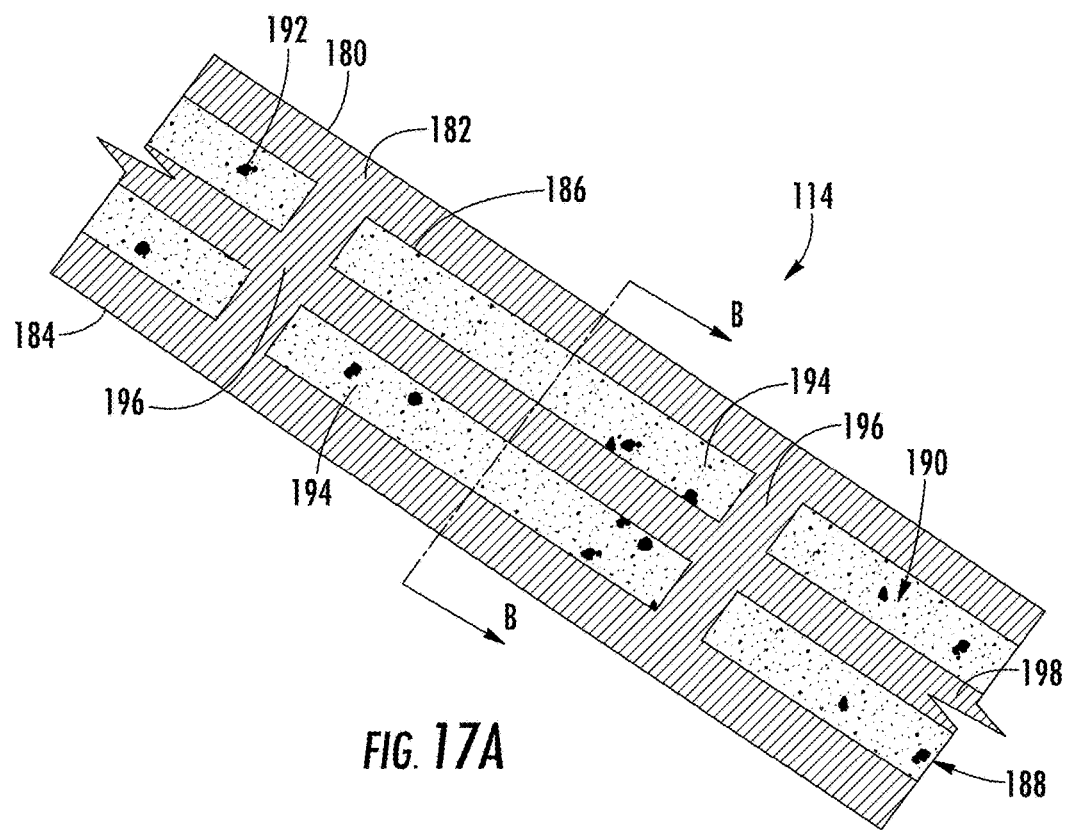
FIG. 17A is a longitudinal cross-sectional view of an alternative embodiment of a lath of the lattice structure of FIG. 13 wherein the lath is sectioned into pockets and a central p extends through the hollow lath.
Figure 17B:
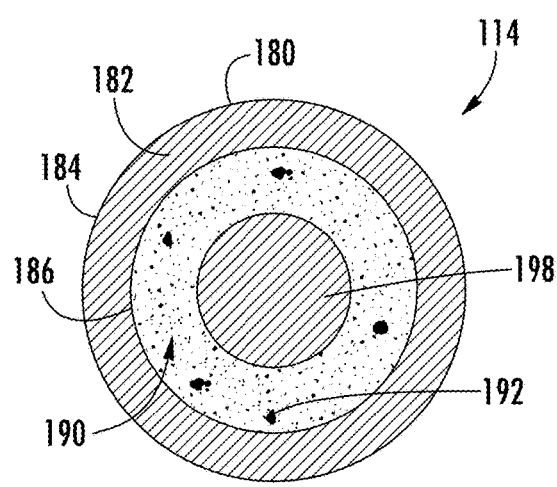
FIG. 17B is a cross-sectional view of the lath of FIG. 17A along line B-B of FIG. 17A.

FIGS. 17A and 17B show yet another embodiment of a hollow tubular structure 180. In the embodiment of FIGS. 17A and 17B, the hollow tubular structure includes a plurality of pockets 194. In addition, a post 198 extends longitudinally through the center of each pocket 194. Each post 198 extends between two solid regions 196 which define the ends of the pocket 194. The post 198 is comprised of the same material as the wall 182 of the hollow tubular structure and is integrally formed with the other components of the lattice structure 110. Advantageously, the post 198 provides additional structural support for the lattice structure 110, while still allowing loose granular material to be provided within the hollow tubular structures 180. This embodiment of FIGS. 17A and 17B provides yet another example of a configuration for a hollow tubular structure that may be incorporated into the entire lattice or one or more regions of the lattice structure 110.

It will be appreciated that the laths 114 with a hollow tubular structure 180 may be incorporated into any of the lattice structures 110 and various configurations disclosed herein, including use of the hollow tubular structure 180 in a lattice and resilient insert combination, as well as use of the hollow tubular structures in only limited regions or zones of the midsole 104 (such as selective use of the hollow tubular structures in various regions of the midsole, as discussed below in association with FIGS. 19-27). In each of the various embodiments disclosed herein, the loose granular material 190 within the hollow tubular structures 180 of the lattice allows the manufacturer to design the midsole 104 with desirable performance features such as energy dampening, cushioning, sound dampening, stability, energy return, and other performance features. While the lattice arrangement itself provides for a resilient midsole with increased energy return qualities, the hollow tubular structures within the lattice also provide for a lighter weight component than would be provided if the tubular structures were completely solid.

Figure 18:
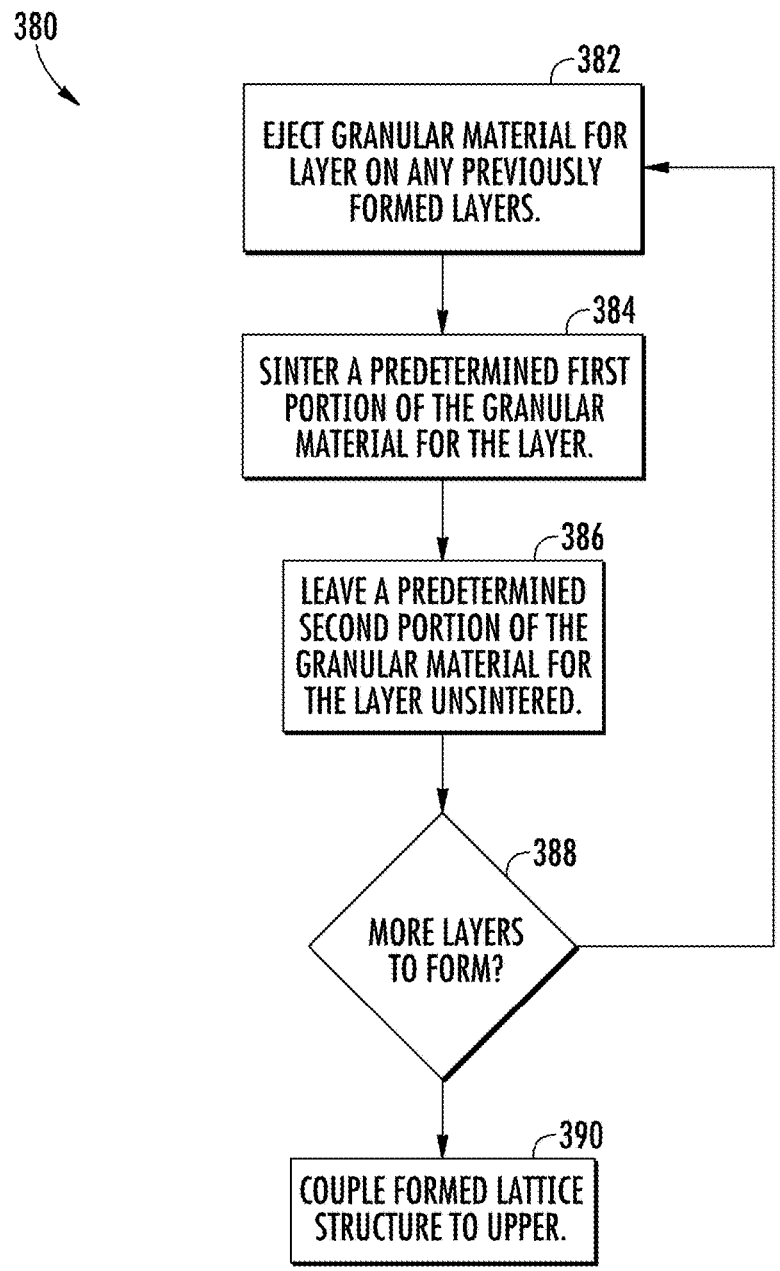
FIG. 18. is a flowchart showing a method of making an article of footwear including hollow tube structures with loose powder within the hollow tube structures.

As noted previously, a process for making an article of footwear including the lattice structure 110 with hollow tubular structures 180 includes a 3D printing process. A flowchart showing the process of making the article of footwear is shown in FIG. 18. The process 380 includes forming the lattice structure for a sole member (such as a midsole) by building up layers during the 3D printing process. As shown in step 382, new layer of the lattice structure 110 is formed by ejecting a granular material onto any subsequent layers of the lattice structure. After the granular material is deposited onto a new layer, sintering of the granular material is performed. In step 384 a predetermined first portion of the ejected granular material in one of the layers is sintered. The sintered material forms a portion of a hollow tubular structure 180 for the lattice structure 110. In step 386, a predetermined second portion of the ejected granular material is left alone and un-sintered in the same layer where the first portion of the ejected granular material was sintered in step 384. This un-sintered granular material forms a portion of loose granular material 190 to be provided within the hollow tubular structure 180 of the completed lattice structure 110. It will be recognized that in at least some layers, the predetermined second portion of the granular material that is left alone may be zero. In other words, in several layers of the 3D printing process all of the ejected granular material is sintered, but in other layers significant portions of the ejected granular material remains un-sintered. In step 388, a determination is made whether additional layers are needed in order to complete the lattice structure 110. If additional layers are needed to complete the lattice structure 110, the process returns to step 382. However, if the lattice structure 110 is complete, the process moves forward to step 390, and the formed lattice structure is coupled to an upper of an article of footwear.

Octahedron Lattice Construction

Figure 19:
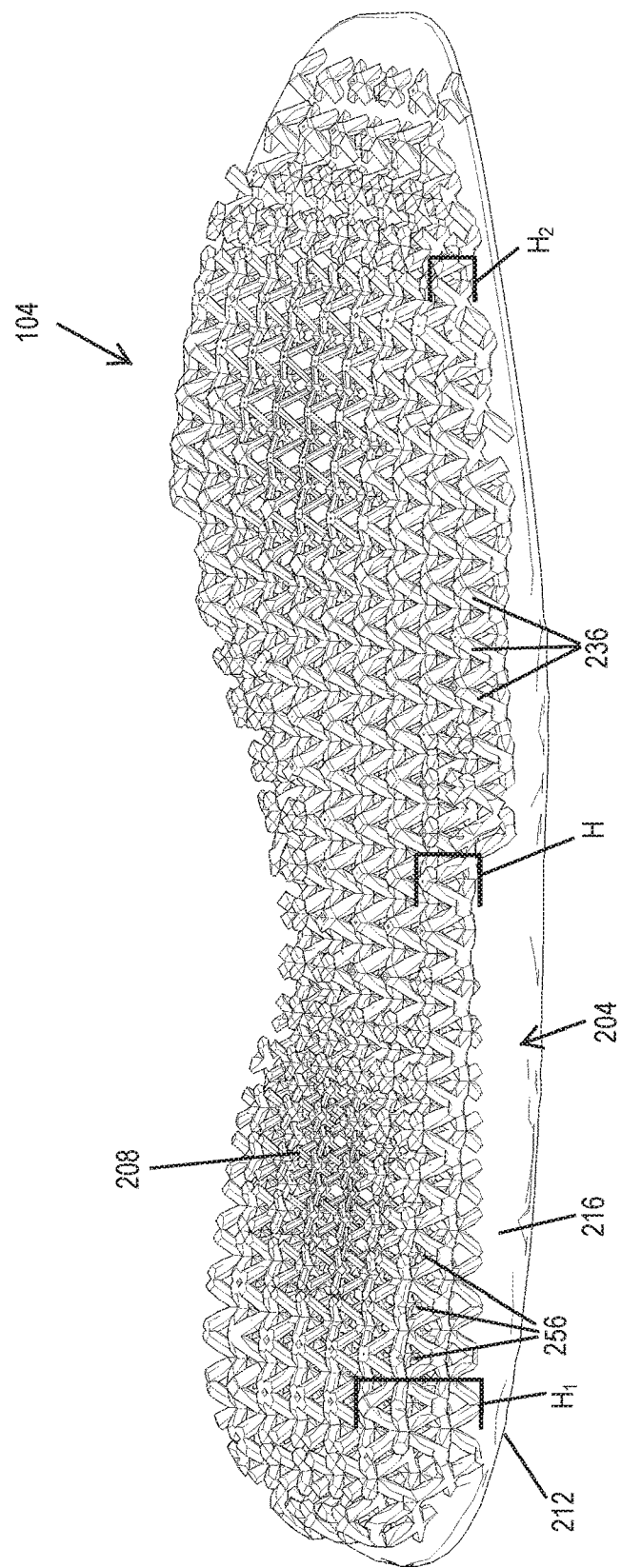
FIG. 19 is a bottom perspective view of a midsole including a platform and a lattice structure with octahedron lattice cells.

While various versions of the lattice structure have been described above, it will be appreciated that numerous other versions are contemplated. For example, in at least one embodiment, the midsole 104 with lattice structure 110 is provided in the form of the midsole arrangement 200 of FIG. 19. As shown in FIG. 19, the midsole arrangement 200 includes an upper platform 204 and a lattice structure or lattice 208. The upper platform 204 includes a first surface 212 and a second surface 216 opposite the first surface 212. The first surface 212 is configured to be oriented toward a bottom of the foot 50 (shown in FIGS. 29 and 30) of a user when the user is wearing a shoe, such as, for example, the shoe 10 shown in FIG. 28, including the midsole 200. The second surface 216 is configured to be oriented away from the bottom of the foot 50 (shown in FIGS. 29 and 30) of the user when the user is wearing a shoe, such as, for example, the shoe 10 shown in FIG. 28, including the midsole 200. The lattice 208 is integrally formed with the second surface 216 of the platform 204 and covers substantially all of the second surface 216 of the platform 204. As used herein, the phrase "integrally formed with" is intended to mean formed together of the same material so as to be inseparable parts of a whole. The platform 204 and lattice 208 are essentially comprised of, for example, a polymer such as, for example, nylon.

Figure 20:
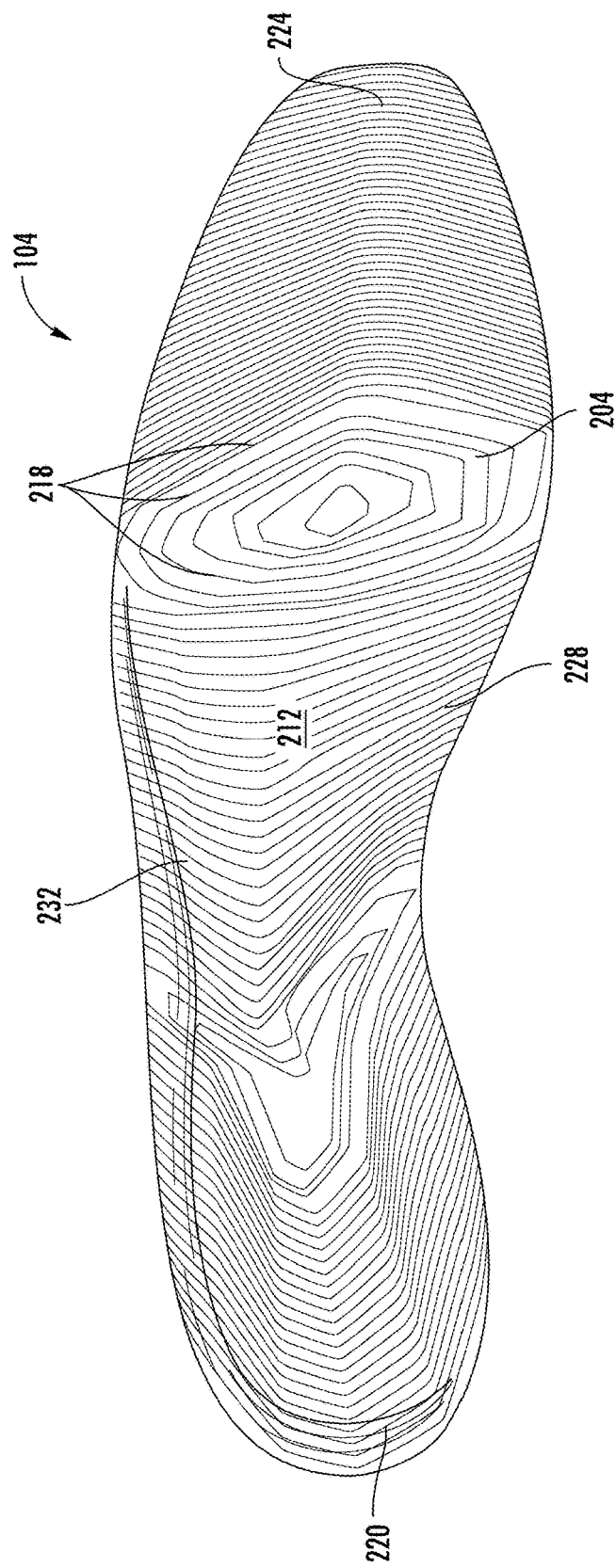
FIG. 20 is a top view of the midsole of FIG. 19.

With reference to FIG. 20, the platform 204 also includes contours 218 formed on the first surface 212 and configured to match contours of a surface of the bottom of the foot 50 (shown in FIGS. 29 and 30) of the user. The contours 218 are substantially shaped as topographic ridges formed as discreet and distinct raised levels from the first surface 212 of the platform 204. By matching the contours 218 of the surface of the bottom of the foot 50 (shown in FIGS. 29 and 30) of the user, the platform 204 is configured to receive the foot 50 (shown in FIGS. 29 and 30) in a manner that feels natural to the user and that provides enhanced support and comfort to the user.

The platform 204 also includes a heel end or heel portion 220, a toe end or toe portion 224, an arch side or medial portion 228, and an outward side or lateral portion 232. The platform 204 is configured such that when the midsole 200 is included in a shoe, such as, for example, the shoe 10 shown in FIG. 28, the heel portion 220 is positioned substantially above the heel end 34 of the sole 18 (shown in FIG. 28), the toe portion 224 is positioned substantially above the toe end 38 of the sole 18 (shown in FIG. 28), the medial portion 228 is positioned substantially above the medial side 42 of the sole 18 (shown in FIG. 28), and the lateral portion 232 is positioned substantially above the lateral side 46 of the sole 18 (shown in FIG. 28). Accordingly, when a user is wearing the shoe including the midsole 200, the heel portion 220 is arranged to support the heel 54 of the foot 50 (shown in FIGS. 29 and 30), the toe portion 224 is arranged to support the toes 56 of the foot 50 (shown in FIGS. 29 and 30), the medial portion 228 is arranged to support the medial side 60 of the foot 50 (shown in FIGS. 29 and 30), and the lateral portion 232 is arranged to support the lateral side 62 of the foot 50 (shown in FIGS. 29 and 30).

Figure 21:
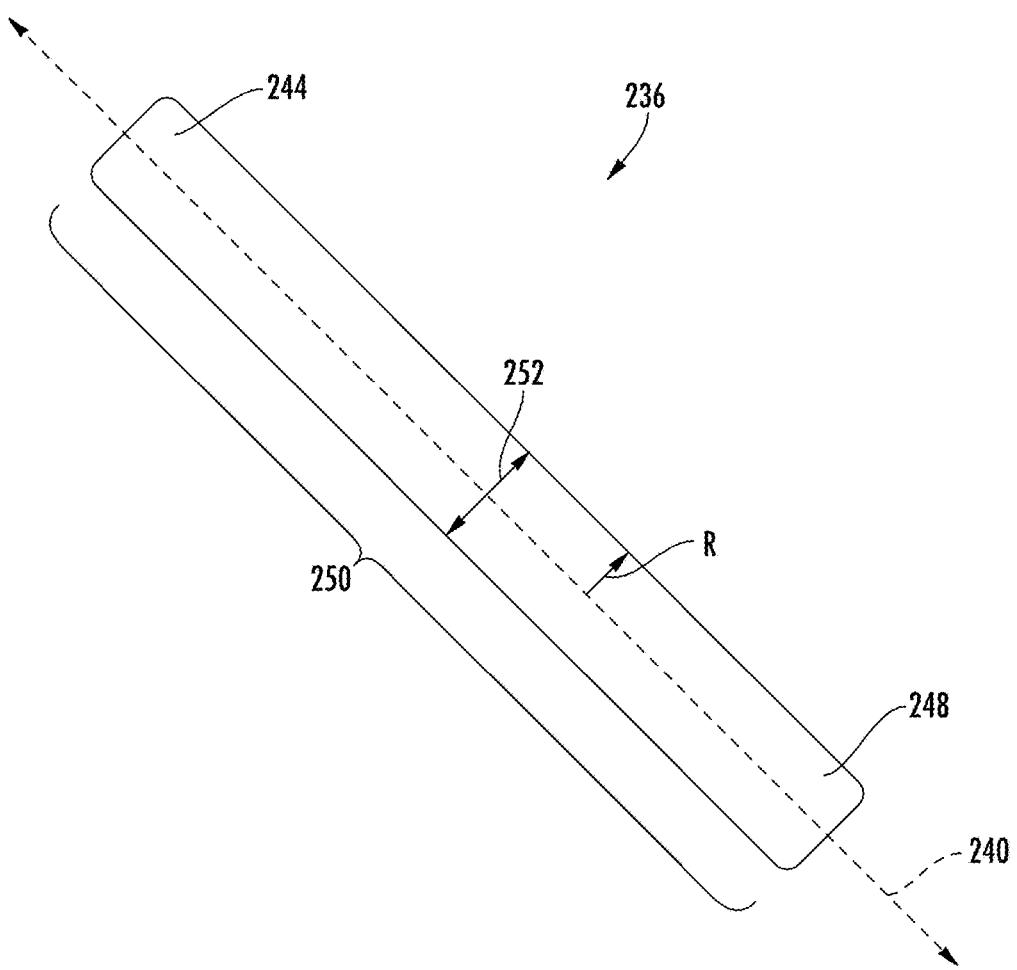
FIG. 21 is an isolated side view of a lath of the lattice structure of FIG. 19.

Returning now to FIG. 19, the lattice 208 extends generally outwardly from the second surface 216 of the platform 204. The lattice 208 includes a plurality of laths 236. For clarity, FIG. 21 shows a schematic drawing of one lath 236 of the plurality of laths 236. The lath 236 has a substantially longitudinal structure including a longitudinal axis 240, a first end 244, and a second end 248. In the exemplary embodiment of FIG. 21, the lath 236 is substantially cylindrical in shape. The lath 236 also has a length 250 and a girth 252 that is centered about the longitudinal axis 240 and extends substantially uniformly from the first end 244 to the second end 248. The girth 252 is a measure of circumference of the lath 236. Because the lath is substantially cylindrically shaped, the girth 252 can be calculated with the radius R measured from the longitudinal axis 240 to the edge of the lath 236 in a direction perpendicular to the lath 236. The girth 252 of the lath is equal to $2 \times \pi \times R$. In at least one exemplary embodiment, the length 250 of the lath 236 is approximately 9 millimeters.

Figure 22:
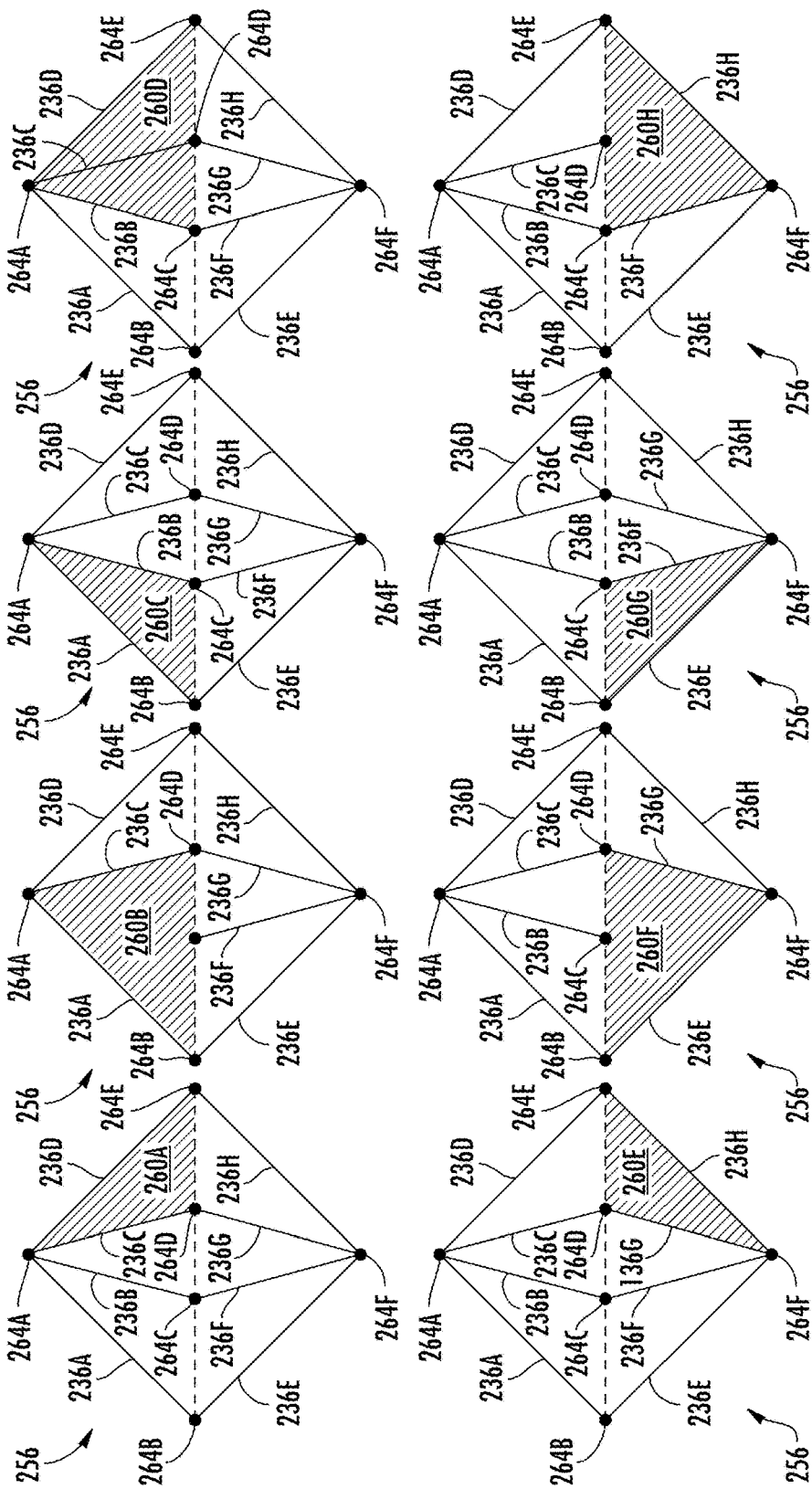
FIG. 22 is a side view illustrating an octahedron cell unit of the lattice structure of FIG. 19.

With continued reference to FIG. 19, the lattice 208 also includes a plurality of cell units 256. For clarity, FIG. 22 shows a schematic drawing of eight views of one cell unit 256 of the plurality of cell units 256. The cell unit 256 is substantially shaped as an octahedron and is defined by eight faces 260A-260H, six vertices 264A-264F, and eight laths 236A-236H. Each of the faces 260A-260H is substantially shaped as an equilateral triangle. An octahedron has a volume determined by the length of each side. Accordingly, the volume of the cell unit 256 is determined by the length 250 of each lath. In at least one exemplary embodiment, each lath 236A-236H has a length of approximately 9 millimeters such that the cell unit 256 has a volume of approximately 0.34 centimeters cubed. So that the volume of the cell unit 256 is not altered by the girth 252 (shown in FIG. 21) of each lath 236A-236H, the volume of the cell unit 256 is measured within the boundary defined by the longitudinal axis 240 (shown in FIG. 21) of each lath 236A-236H.

With continued reference to FIG. 22, each of the six vertices 264A-264F is formed by the intersection or joining together of the first end 244 or the second end 248 (shown in FIG. 21) of at least two of the laths 236A-236H. More specifically, vertex 264A is formed by the intersection of an end of four laths: 236A, 236B, 236C and 236D. Vertex 264B is formed by the intersection of an end of two laths: 236A and 236E. Vertex 264C is formed by the intersection of an end of two laths: 236B and 236F. Vertex 264D is formed by the intersection of an end of two laths: 236C and 236G. Vertex 264E is formed by the intersection of an end of two laths: 236D and 236H. Finally, vertex 264F is formed by the intersection of an end of four laths: 236E, 236F, 236G and 236H.

Each of the faces 260A-260H is defined by an area, bound by two laths of the laths 236A-236H, within a plane defined by three adjacent vertices of the vertices 264A-264F. More specifically, the face 260A is an area, bound by laths 236C and 236D, within the plane defined by adjacent vertices 264A, 264D and 264E. The face 260B is an area, bound by laths 236A and 236C, within the plane defined by adjacent vertices 264A, 264B and 264D. The face 260C is an area, bound by laths 236A and 236B, within the plane defined by adjacent vertices 264A, 264B and 264C. The face 260D is an area, bound by laths 236B and 236D, within the plane defined by adjacent vertices 264A, 264C and 264E. The face 260E is an area, bound by laths 236G and 236H, within the plane defined by adjacent vertices 264D, 264E and 264F. The face 260F is an area, bound by laths 236E and 236G, within the plane defined by adjacent vertices 264B, 264D and 264F. The face 260G is an area, bound by laths 236E and 236F, within the plane defined by adjacent vertices 264B, 264C and 264F. Finally, the face 260H is an area, bound by laths 236F and 236H, within the plane defined by adjacent vertices 264C, 264E and 264F.

Returning to FIG. 19, the lattice 208 includes a plurality of cell units 256 arranged adjacent to one another and integrally formed with one another to construct the lattice 208 as a single unitary part. The lattice 208 forms a uniform three-dimensional pattern, and adjacent cell units 256 share laths 236 and/or vertices 264 (shown in FIG. 22) such that a single lath 236 can be shared by as many as two adjacent cell units 256, and a single vertex 264 (shown in FIG. 22) can be shared by as many as six adjacent cell units 256. Because each cell unit 256 in the pattern is substantially similar, each uniform cell unit 256 in the pattern has a substantially uniform volume.

The lattice 208 extends with a height H from the second surface 216 of the platform 204. The height H of the lattice 208 varies along the platform 204 from the heel portion 220 to the toe portion 224 and from the medial portion 228 to the lateral portion 232. For example, as shown in FIG. 19, the height $H_1$ is different than the height $H_2$.

Figure 23:
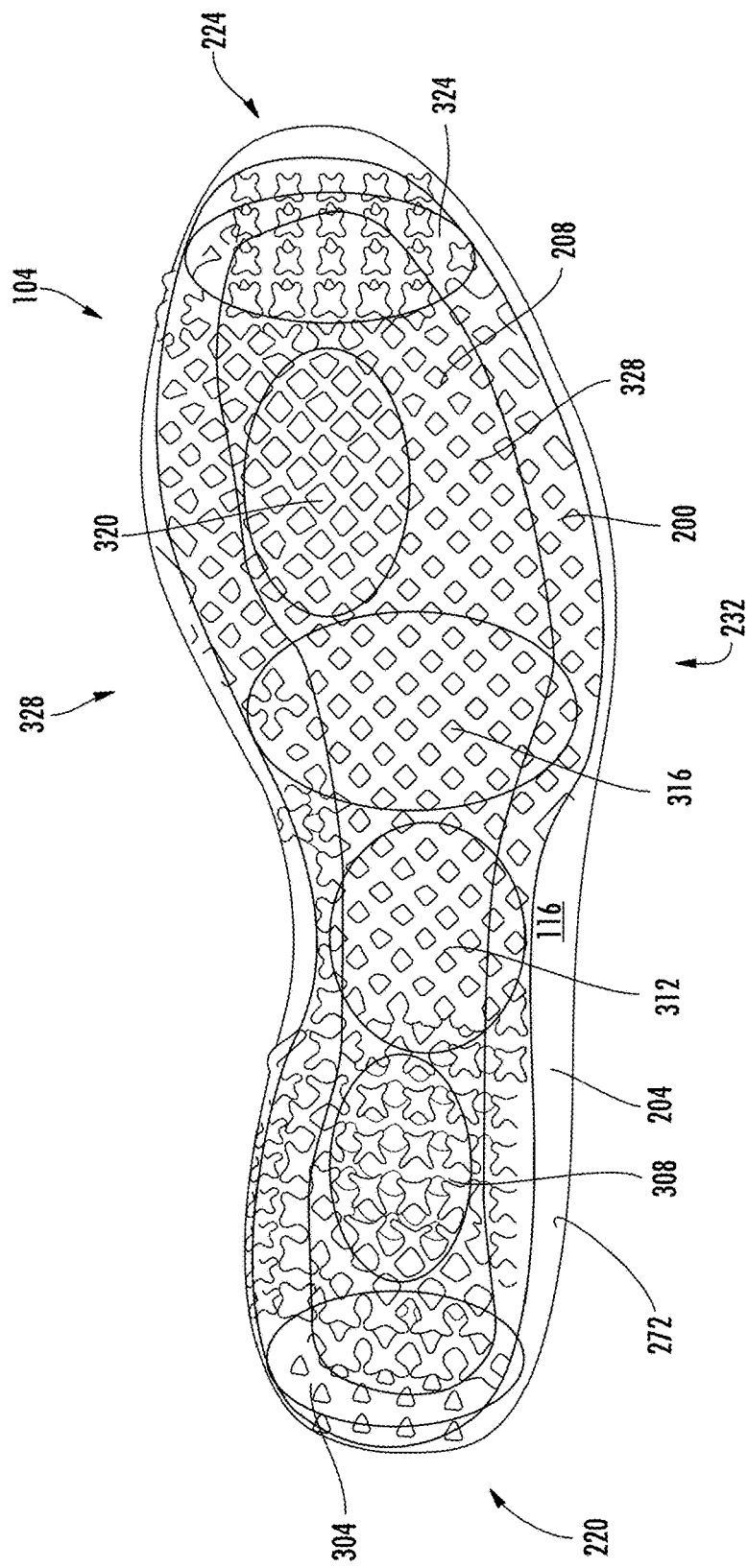
FIG. 23 is a bottom view of the midsole of FIG. 19.
Figure 29:
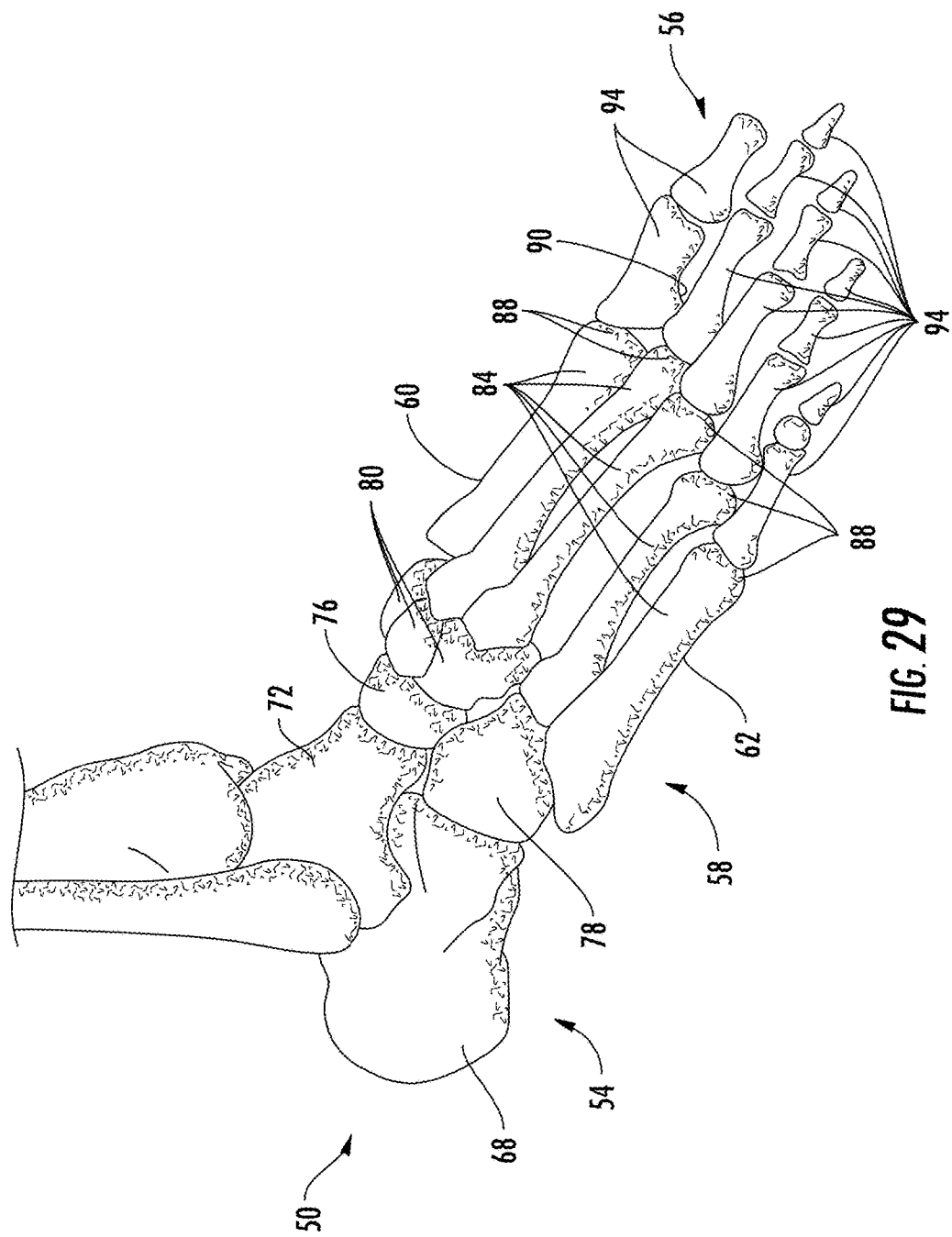
FIG. 29 is a perspective medial side view of a bone structure of a foot.
Figure 30:
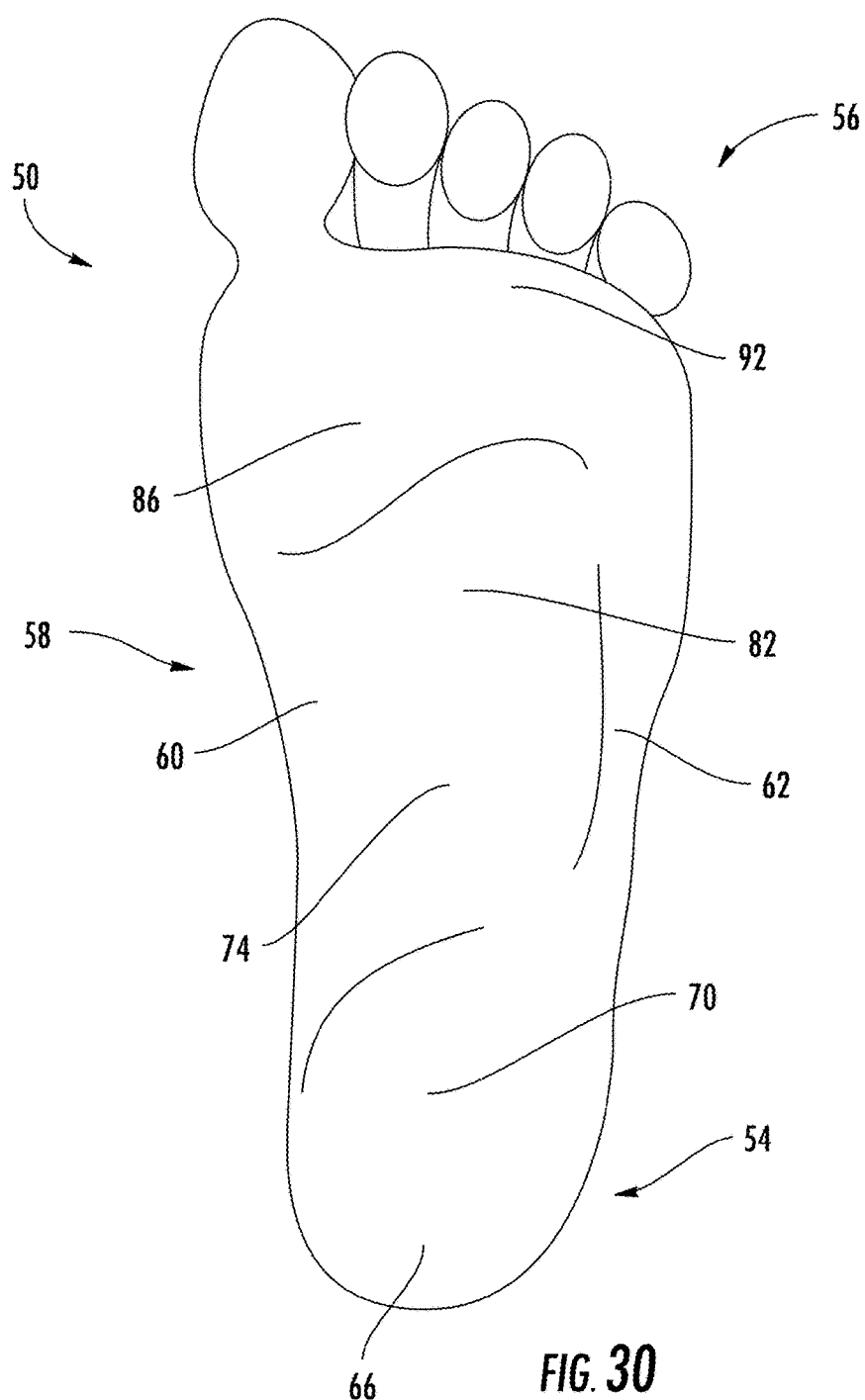
FIG. 30 is a plan view of a bottom view of a foot.

As shown in FIG. 23, the platform 204 is shaped to substantially match the shape of the bottom of the foot 50 (shown in FIGS. 29 and 30). Accordingly, the platform 204 has an irregular perimeter 272. Because the lattice 208 is integrally formed with and covers substantially the entirety of the second surface 216 of the platform 204, the lattice 208 is truncated in all directions. In other words, the pattern of the lattice 208 does not extend infinitely in all three dimensions, but is limited by the height H (shown in FIG. 19) and the perimeter 272 and is truncated where it is limited by the height H (shown in FIG. 19) and the perimeter 272. Accordingly, a portion of the plurality of laths 236 (shown in FIG. 21), a portion of the plurality of vertices 264 (shown in FIG. 22), and a portion of the plurality of cell units 256 (shown in FIG. 22) in the lattice 208 are incompletely formed.

For clarity, FIGS. 24A-24C illustrate of a number of incompletely formed parts of the lattice 208. More specifically, as shown in FIG. 24B, by virtue of their position relative to the height H and abutting the perimeter 272 (shown in FIG. 23), partial or incomplete laths 276 have a length L that is shorter than the length 250 of the fully formed laths 236. Similarly, as shown in FIG. 24C, partial or incomplete vertices 280 are formed by the intersection of fewer laths 236 than the four laths 236 which intersect at fully formed vertices 264 (shown in FIG. 22). Similarly, partial or incomplete cell units 284 have fewer than eight laths 236 and/or fewer than six vertices 264. Additionally, as shown in FIG. 24A, at least some incomplete cell units 284 are formed of incomplete laths 276 and/or incomplete vertices 280. The incomplete laths 276, incomplete vertices 280, and incomplete cell units 284 are non-uniform with one another but are different as they are positioned in different locations on the lattice 208 truncated by the perimeter 272 (shown in FIG. 23) and the height H (shown in FIG. 19). Each incomplete cell unit 284 is defined by at least one vertex 264 or incomplete vertex 280 and at least two laths 236 or incomplete laths 276. Accordingly, each incomplete cell unit 284 is defined by at least two partial or incomplete faces 288 defined by an area within a plane formed by at least one vertex 264 or incomplete vertex 280 and bound by at least a portion of two laths 236 or incomplete laths 276.

Tuned Lattice Zones

Returning now to FIG. 23, the lattice 208 includes a plurality of regions or zones formed along the midsole 200 and positioned relative to the heel portion 220, the toe portion 224, the medial portion 228, and the lateral portion 232. Specifically, the lattice 208 includes a perimeter zone 300, a calcaneus zone 304, a talus zone 308, a longitudinal arch zone 312, a metatarsal zone 316, a ball of the foot zone 320, and a toe zone 324. Each zone includes complete cell units 256 (shown in FIG. 22) and incomplete cell units 284 (shown in FIG. 24A-C), complete laths 236 (shown in FIG. 21) and incomplete laths 276 (shown in FIG. 24A-C), and complete vertices 264 (shown in FIG. 22) and incomplete vertices 280 (shown in FIG. 24A-C) that are located within that zone of the lattice 208. In other words, the term cell unit can be used to refer to a complete cell unit and an incomplete cell unit, the term lath can be used to refer to a complete lath and an incomplete lath, the term vertex can be used to refer to a complete vertex and an incomplete vertex, and the term face can be used to refer to a complete face and an incomplete face.

The perimeter zone 300 is arranged substantially along the perimeter 272 of the platform 204 and generally extends approximately 1-20 millimeters inwardly from the perimeter 272. The calcaneus zone 304 is arranged substantially at the heel portion 220 of the platform 204 and is substantially centered between the medial portion 228 and the lateral portion 232. The talus zone 308 is arranged nearer to the toe portion 224 of the platform 204 than the calcaneus zone 304 and is substantially centered between the medial portion 228 and the lateral portion 232. The longitudinal arch zone 312 is arranged nearer to the toe portion 224 of the platform 204 than the talus zone 308 and is substantially spread across the medial portion 228 and the lateral portion 232. The metatarsal zone 316 is arranged nearer to the toe portion 224 of the platform 204 than the longitudinal arch zone 312 and is substantially spread across the medial portion 228 and the lateral portion 232. The ball of the foot zone 320 is arranged nearer to the toe portion 224 of the platform 204 than the metatarsal zone 316 and is arranged nearer to the medial portion 228 than the lateral portion 232. The toe zone 324 is arranged nearer to the toe portion 224 of the platform 204 than the ball of the foot zone 320 and is substantially spread across the medial portion 228 and the lateral portion 232.

The lattice 208 further includes transition areas 328 arranged around and between the other zones 300, 304, 308, 312, 316, 320, 324. The transition areas 328 include cell units 256 and incomplete cell units 284, laths 236 and incomplete laths 276, and vertices 264 and incomplete vertices 280 that are not located within any other of the other zones 300, 304, 308, 312, 316, 320, 324 of the lattice 208.

Figure 28:
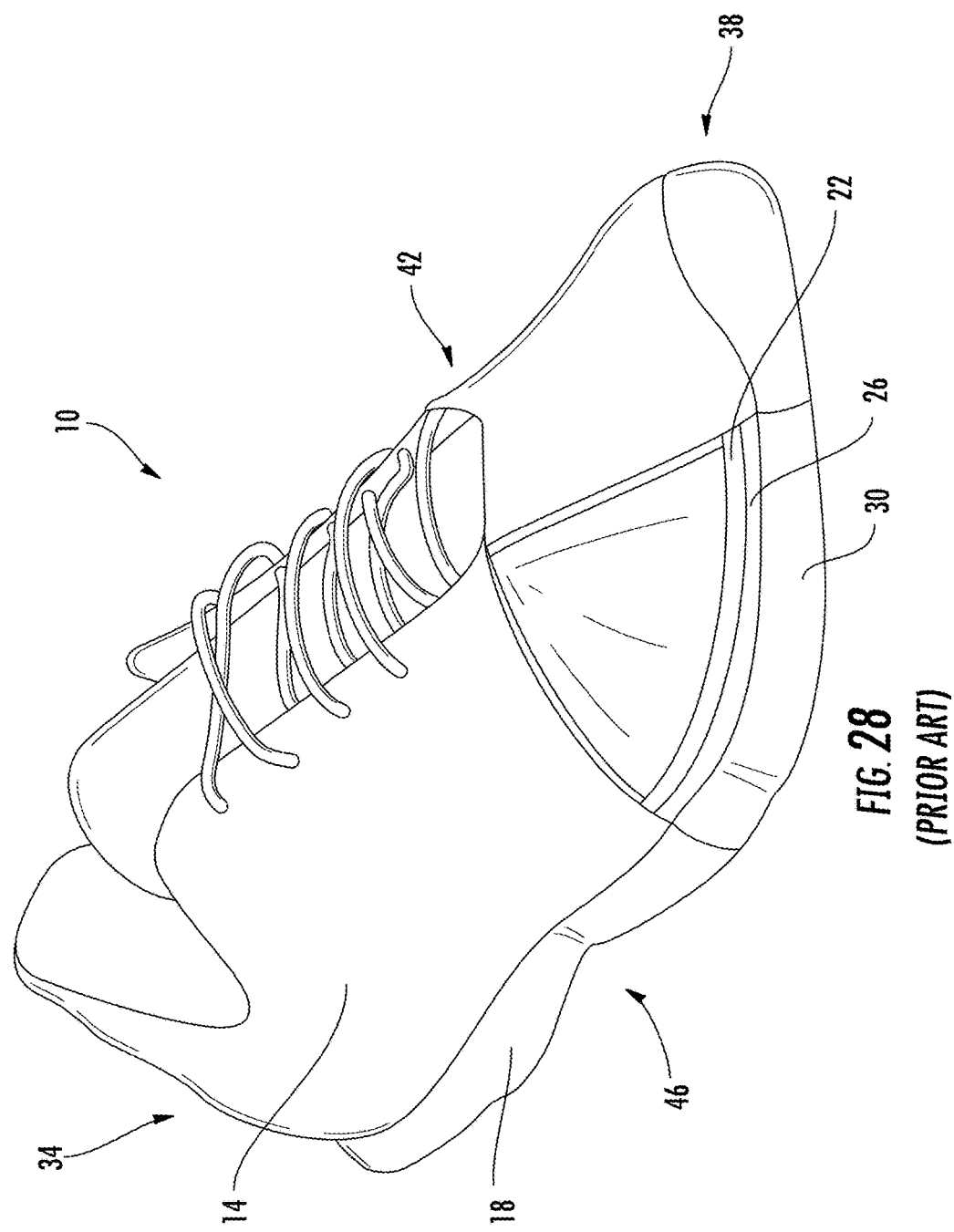
FIG. 28 is a perspective view of an article of footwear in the form of a shoe as is generally known in the prior art.

The zones 300, 304, 308, 312, 316, 320, 324 are arranged on the lattice 208 such that when the midsole 200 is included in a shoe, like the shoe 10 shown in FIG. 28, a user's foot 50 (shown in FIGS. 29 and 30) aligns with the midsole 200 and the various zones 300, 304, 308, 312, 316, 320, 324 align to support the various regions of the user's foot 50. More specifically, when a user wears the shoe 10 including the midsole 200, the bottom of the foot 50 (shown in FIGS. 29 and 30) is generally aligned within the perimeter zone 300, the calcaneus region 66 (shown in FIG. 30) generally aligns with the calcaneus zone 304, the talus region 70 (shown in FIG. 30) generally aligns with the talus zone 308, the longitudinal arch region 74 (shown in FIG. 30) generally aligns with the longitudinal arch zone 312, the metatarsal region 82 (shown in FIG. 30) generally aligns with the metatarsal zone 316, the ball of the foot region 86 (shown in FIG. 30) generally aligns with the ball of the foot zone 320, and the toe region 92 (shown in FIG. 30) generally aligns with the toe zone 324.

Because the user's foot 50 (shown in FIGS. 29 and 30) varies in shape and structure and bears different amounts of pressure in different regions during different stages of a gait cycle, to provide support and comfort to the user throughout the gait cycle, the zones 300, 304, 308, 312, 316, 320, 324 of the lattice 208 also vary in shape and structure, thereby tuning the various regions or zones of the lattice to specifically accommodate a particular user, foot, or gait cycle. Additionally, the height H (shown in FIG. 19) of the lattice 208 and/or the girths 252 (shown in FIG. 21) of the laths 236 and incomplete laths 276 differ between the different zones 300, 304, 308, 312, 316, 320, 324 of the lattice 208. The height H (shown in FIG. 19) is expressible as a typical scale measurement (i.e., 4 millimeters) and is also expressible as the number of cell units 256 (shown in FIG. 22) stacked on top of one another. By way of example, laths 236 (shown in FIG. 21) and incomplete laths 276 (shown in FIG. 24A-C) located within the longitudinal arch zone 312 have girths 252 (shown in FIG. 21) that differ from the girths 252 of laths 236 and incomplete laths 276 located within the ball of the foot zone 320. The heights H (shown in FIG. 19) and girths 252 (shown in FIG. 21) of laths 236 and incomplete laths 276 within the transition area 328 are gradations between adjacent zones 300, 304, 308, 312, 316, 320, 324 to form smooth transitions of heights H (shown in FIG. 19) of the lattice 208 and girths 252 (shown in FIG. 21) of the laths 236 and incomplete laths 276 between the zones 300, 304, 308, 312, 316, 320, 324.

Higher heights H provide more material in the lattice 208 extending from the second surface 216 of the platform 204 which can be compressed by the foot 50 (shown in FIGS. 29 and 30) as the user applies pressure during the gait cycle. Conversely, lower heights H provide less padding and position the foot 50 closer to the ground. A gradual decrease in the height H of the lattice 208 from the heel portion 220 to the toe portion 224 of the platform 204 promotes natural rolling from the heel 54 to the toes 56 of the foot 50 during gait. Thicker girths 252 provide stiffer material in the lattice 208 which is less compressible and less springy when compressed by the foot 50 (shown in FIGS. 29 and 30) as the user applies pressure during the gait cycle. This is useful, for example, for providing stability and maintaining structure under the applied pressure. Conversely, thinner girths 252 provide softer material in the lattice 208 which is more compressible and springier when compressed by the foot 50 as the user applies pressure during the gait cycle. This is useful, for example, for providing spring when the user pushes off or removes pressure and for deforming to better absorb impact. Varying combinations of height H and girth 252 result in various amounts of padding, compressibility, softness, and stiffness which are appropriate for accommodating the foot 50 (shown in FIGS. 29 and 30) in the different zones 300, 304, 308, 312, 316, 320, 324 of the lattice 208 during different stages of the gait cycle.

More specifically, in the perimeter zone 300, the lattice 208 has a varying height H and laths 236 and incomplete laths 276 with relatively thick girths 252. The height H of the lattice 208 is higher at the heel portion 220 and lower at the toe portion 224 to promote natural rolling from the heel 54 to the toes 56 of the foot 50. The relatively thick girths 252 provide extra support to the outside of the user's foot 50 to keep the foot 50 aligned with the midsole 200. The laths 236 and incomplete laths 276 in the perimeter zone 300 have girths 252 in a range of, for example, approximately 4.5 to 5.5 millimeters.

In the calcaneus zone 304, the lattice 208 has a relatively high height H and laths 236 and incomplete laths 276 with relatively thick girths 252 to provide substantial padding with relatively stiff cushion to the calcaneus bone 68. This is useful to pad the calcaneus region 66 of the foot 50 when a user initially makes contact with the ground during gait because a force of the impact on the calcaneus bone 68 can be quite high during that event. The calcaneus zone 304 also should not be too soft so that the lattice 208 does not compress completely under the high force. The height H of the lattice 208 is, for example, two complete cell units 256 stacked on top of one another, or approximately 19 millimeters.

In the talus zone 308, the lattice 208 has a relatively high height H and laths 236 and incomplete laths 276 with relatively thin girths 252 to provide substantial padding with relatively soft cushion to the talus region 70 of the foot 50 during gait. The height H of the lattice 208 in the talus zone 308 is less than the height H of the lattice 208 in the calcaneus zone 304 to promote natural rolling from the heel 54 to the toes 56 of the foot 50. The height H is still sufficiently high to provide substantial cushion near the high force. The girths 252 are thin enough to provide softer cushioning and springiness as the user pushes off the heel 54 and begins to roll the foot 50 toward the arch 58. The laths 236 and incomplete laths 276 in the talus zone 308 have girths 252 of, for example, approximately 3 millimeters.

In the longitudinal arch zone 312, the lattice 208 has a moderate height H and laths 236 and incomplete laths 276 with relatively thick girths 252 to provide some padding with stiffer support to the longitudinal arch region 74 of the foot 50 during gait to reduce collapse of the arch 58 of the foot 50 as the user bears weight on the arch 58. The height H of the lattice 208 in the longitudinal arch zone 312 is, for example, slightly more than one cell unit 256 or approximately 14 millimeters. The laths 236 and incomplete laths 276 in the longitudinal arch zone 312 have girths 252 in a range of, for example, approximately 4.5 to 5.5 millimeters.

In the metatarsal zone 316, the lattice 208 has a moderate height H and laths 236 and incomplete laths 276 with moderately thick girths 252 to provide some padding with some support to the metatarsal region 82 of the foot 50 during gait. The height H of the lattice 208 in the metatarsal zone 316 is, for example, slightly less than the height H of the lattice 208 in the longitudinal arch zone 312 to promote natural rolling from the heel 54 to the toes 56 of the foot 50. The laths 236 and incomplete laths 276 in the metatarsal zone 316 have girths 252, for example, slightly thinner than the girths 252 of the laths 236 and incomplete laths 276 in the longitudinal arch zone 312.

In the ball of the foot zone 320, the lattice 208 has a relatively low height H and laths 236 and incomplete laths 276 with relatively thin girths 252 to provide relatively little padding with relatively soft cushion and relatively high springiness to the ball of the foot region 86 of the foot 50 during gait. The relatively low height H, compared to zones nearer to the heel portion 220 of the platform 204, promotes natural rolling from the heel 54 to the toes 56 of the foot 50 during the stages of gait by naturally guiding the foot 50 along a downward angle from the heel portion 220 toward the toe portion 224 of the platform 204. Additionally, the relatively low height H of the lattice 208 in the ball of the foot zone 320 provide less cushion than other zones because the ball of the foot region 86 of the foot 50 is naturally more padded than surrounding regions of the foot 50 and thus includes natural cushion to be compressed by the foot 50 during gait. The height H of the lattice 208 in the ball of the foot zone 320 is, for example, approximately 9 millimeters. The relatively thin girths 252 provide springiness as the user begins to push off the foot 50 during gait. The laths 236 and incomplete laths 276 in the ball of the foot zone 320 have girths 252 of, for example, approximately 3 millimeters.

In the toe zone 324, the lattice 208 has low height H and laths 236 and incomplete laths 276 with relatively thick girths 252 to provide little cushion and enough stiffness for the user to push off of during gait. The low height H promotes natural rolling toward the toes 56 of the foot 50 at the end of a gait cycle. The height H is sufficient to provide structure for the user to push off of at the end of a gait cycle. The height H of the lattice 208 in the toe zone 324 is in a range of, for example, approximately 3 to 5 millimeters. The relatively thick girths 252 also provide sufficient structure for the user to push off of at the end of a gait cycle. The laths 236 and incomplete laths 276 in the toe zone 324 have girths 252 of, for example, approximately 4.5 millimeters.

The arrangement of laths 236 and incomplete laths 276 and cell units 256 and incomplete cell units 284 within the zones 300, 304, 308, 312, 316, 320, 324 of the lattice 208 provide a midsole 104 that is able to be included in a shoe to provide comfort and utility for a user by accommodating the foot 50 during all stages of the gait cycle. The lattice 208 enables the midsole 200 to provide mechanical cushioning by deforming along the structure of the lattice 208, rather than just compressing, under the weight and applied pressure of the user. Further, the lattice 208 enables the midsole 104 to provide various types and amounts of cushioning to the various regions of the foot 50 due to differences in height H and girth 252 across the different zones 300, 304, 308, 312, 316, 320, 324 of the lattice 208. Accordingly, the midsole 200 provides three-dimensional zonal compression to a user during all stages of the gait cycle.

Alternative Embodiment of Lattice Midsole Coupled to Outsole

Figure 25:
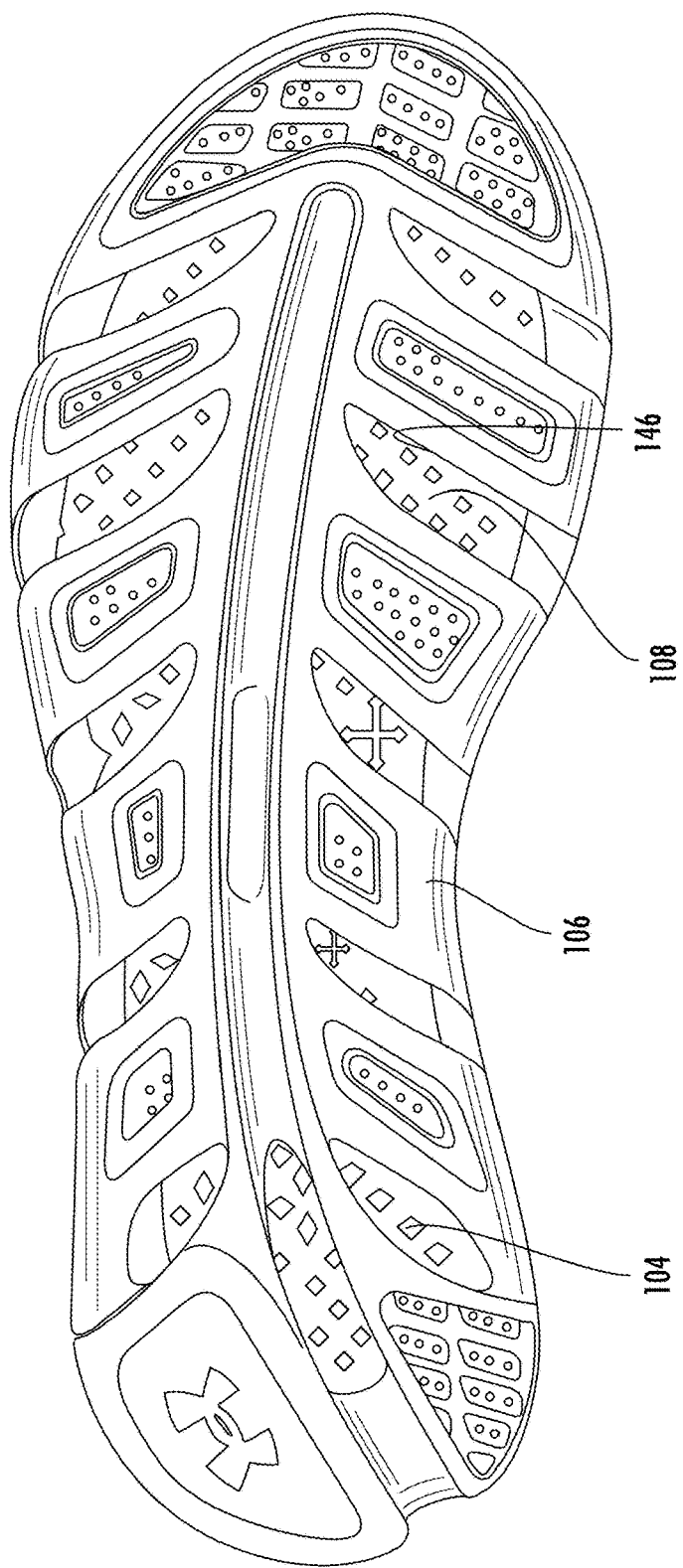
FIG. 25 is a bottom view of the midsole of FIG. 19 positioned within an outsole.

As shown in FIG. 25, in at least one exemplary embodiment, the midsole 104 is configured to be inserted into an outsole 106. By forming the midsole 104 as a single, unitary piece capable of being inserted into the outsole 106, it is possible to produce customized shoes. In the exemplary embodiment shown in FIG. 25, the midsole 200 fits tightly within the outsole 106 such that the lattice 208 is visible through openings 146 formed in the outsole 106. The openings 146 provide visual access to the midsole 200 from outside the customized shoe.

Production of Midsole Using Three-Dimensional Printing Process

As mentioned above, the platform 204 and the lattice 208 are integrally formed, and the lattice 208 is formed as a single, unitary piece. Accordingly, the entire midsole 200 is formed as a single, unitary piece. As used herein, the term "single, unitary piece" is intended to mean an indivisible part that is not joined together after being formed and cannot be disassembled without destruction of the part. To form the three-dimensional structure of the midsole 200, including the open crisscrossing structure of the lattice 208, as a single, unitary piece must be accomplished using a highly capable manufacturing technique. More specifically, the midsole 200 is not formed using injection molding processes and the midsole 200 does not include any indications of injection molding processes, including gate marks, sprue marks, parting line marks, and ejector pin marks. In this exemplary embodiment, the midsole 200 is formed using three-dimensional printing or selective laser sintering processes.

Figure 26:
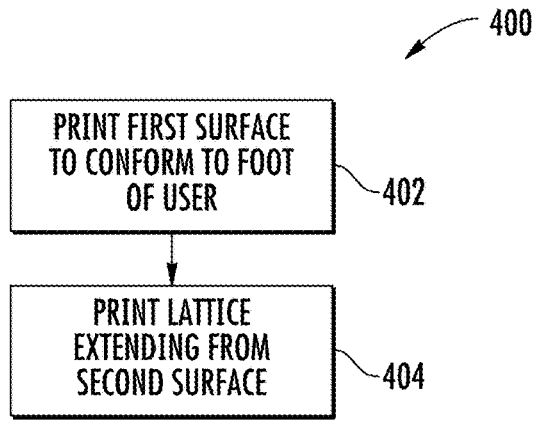
FIG. 26 is a flowchart depicting a process for forming the midsole of FIG. 19.

As is known in the art, three-dimensional printing and selective laser sintering processes are known as "additive processes" because they include progressively adding material to form the product. This is in contrast to manufacturing processes that start with a larger piece and progressively remove material to form the product. As shown in FIG. 26, the midsole 200 is formed using process 400. To form the midsole 200 using three-dimensional printing and selective laser sintering processes, the platform 204 and the lattice 208 are printed such that the first surface 212 of the platform 204 conforms to the foot 50 of the user (step 402) and the lattice 208 extends from the second surface 216 of the platform (step 404). Printing the lattice 208 includes printing the laths 236 and the incomplete laths 276 joined together at vertices 264 and incomplete vertices 280 to form cell units 256 and incomplete cell units 284. In at least one exemplary embodiment, the steps of the process are performed in reverse order. In at least one exemplary embodiment, the steps of the process are performed simultaneously.

By forming the midsole 200 with three-dimensional printing and selective laser sintering processes it is possible to form complex three-dimensional structures including undercuts and patterns of through holes, such as the crisscrossing structure of the lattice 208. Additionally, the lattice 208 and the platform 204 can be integrally formed of the same material in the same processing step. Because the midsole 200 is a single, unitary piece, the comfort and utility provided to the user can be accomplished with one piece instead of many. Accordingly, it is possible that the midsole 200 is less expensive to produce than a larger number of parts to be combined together to accomplish the same objective as the midsole 200.

Figure 27:
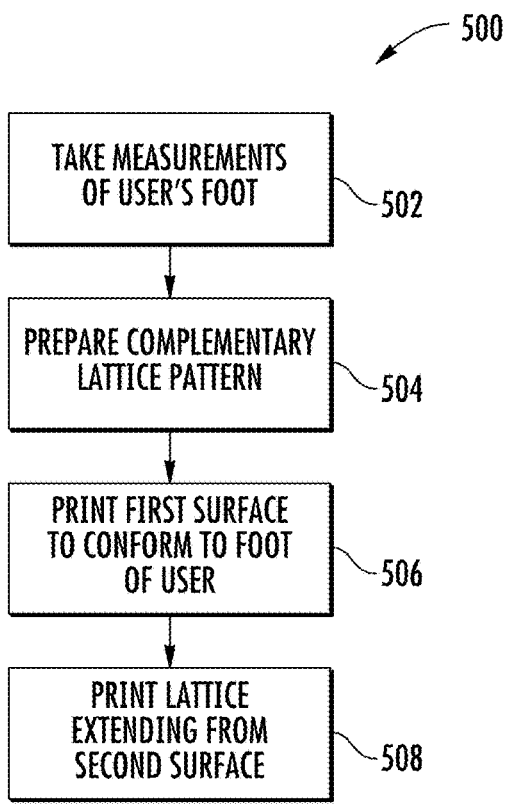
FIG. 27 is a flowchart depicting another process for forming the midsole of FIG. 19.

In at least one exemplary embodiment, the midsole 200 is specifically configured to conform to a particular user's foot. As shown in FIG. 27, the midsole 200 of this exemplary embodiment is formed using a process 500. More specifically, measurements of a user's foot are taken (step 502), including shape and size as well as force and pressure distributions along the bottom of the foot during the stages of various gait cycles. These measurements are used to prepare a pattern for a complementary lattice 208 (step 504) with properties of the zones 300, 304, 308, 312, 316, 320, 224 and properties of the laths 236 and incomplete laths 276 and cell units 256 and incomplete cell units 284 within the zones 300, 304, 308, 312, 316, 320, 324 determined by the user's individual characteristics. By way of example, if the user applies a great amount of pressure to the heel 54 of the foot 50 during initial contact with the ground during a gait cycle, the height H of the lattice 208 in the calcaneus zone 304 is increased to provide additional cushion. Similarly, by way of example, if the user's arch 58 tends to collapse inwardly while the user applies pressure during the gait cycle, the girths 252 of the laths 236 and incomplete laths 276 in the longitudinal arch zone 312 are increased to provide additional support and reduce compression. In this way, the midsole 200 is customizable and can be configured to provide custom support to the various regions of the foot 50 through each of the zones 300, 304, 308, 312, 316, 320, 324. Next the midsole 200 is formed using three-dimensional printing and selective laser sintering processes, the platform 204 and the lattice 208 are printed such that the first surface 212 of the platform 204 conforms to the foot 50 of the user (step 506) and the lattice 208 extends from the second surface 216 of the platform (step 508). Printing the lattice 208 includes printing the laths 236 and the incomplete laths 276 joined together at vertices 264 and incomplete vertices 280 to form cell units 256 and incomplete cell units 284. In at least one exemplary embodiment, steps 506 and 508 of the process are performed in reverse order. In at least one exemplary embodiment, steps 506 and 508 of the process are performed simultaneously.

As described above, a midsole including a lattice structure may be configured in various ways to allow in order to fine-tune the midsole to meet the needs of different users. It will be appreciated that the performance qualities of the midsole may be adjusted as desired based on the arrangement and configuration of the lattice structure, including lattice size and shape, solid or hollow lattice, placement of the resilient insert within the lattice, and different configurations for the resilient insert. The foregoing detailed description of exemplary embodiments of the footwear with lattice midsole has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. An article of footwear comprising:
an upper; and
a sole member connected to the upper, the sole member including a plurality of tubular structures, the plurality of tubular structures at least partially filled with a loose granular material, wherein the plurality of tubular structures are provided as a plurality of laths that form a lattice structure.

2. The article of footwear of claim 1 wherein the loose granular material is a powder.

3. The article of footwear of claim 2 wherein the powder is provided by a non-fused powder comprised of a first material, and the lattice structure is provided by a fused powder comprised of the first material.

4. The article of footwear of claim 1, the plurality of laths positioned in at least a first zone and a second zone of the sole member, each lath in the first zone having a first girth that is substantially different from a second girth of each lath in the second zone.

5. The article of footwear of claim 1, wherein the plurality of laths are varied in diameter throughout the sole member.

6. The article of footwear of claim 1, wherein a plurality of distinct pockets are formed in the plurality of laths.

7. The article of footwear of claim 1, wherein a recess is formed in the lattice structure and a resilient insert is positioned within the recess.

8. The article of footwear of claim 1 wherein the loose granular material comprises a nylon material.

9. The article of footwear of claim 1 wherein the granular material is between 10 microns and 100 microns in diameter.

10. The article of footwear of claim 1 wherein the tubular structures are substantially cylindrical in shape and between 1 mm and 6 mm in diameter.

11. The article of footwear of claim 1 wherein the tubular structures are substantially hollow but for the loose granular material.

12. The article of footwear of claim 11 wherein the loose granular material is packed granular material that fills between about 25% and 75% of space within the tubular structures.

13. The article of footwear of claim 1 wherein the loose granular material is comprised of a non-fused powder and the tubular structures are comprised of a fused powder.

14. The article of footwear of claim 1, the sole including an outsole, an insole, and a midsole, the tubular structures provided on the midsole.

15. An article of footwear comprising:
an upper;
a midsole connected to upper, the midsole including a lattice structure including a plurality of laths, the lattice structure including at least one hollow lath such that an inner void is formed within the at least one hollow lath; and
a loose granular material provided within the inner void of the at least one hollow lath.

16. The article of footwear of claim 15 wherein each of the plurality of laths is a tubular structure and the at least one hollow lath defines an inner channel extending through the tubular structure, wherein the loose granular material within the inner channel is comprised of a non-fused powder and the tubular structure is comprised of a fused powder.

17. The article of footwear of claim 15 wherein the lattice structure includes a plurality of hollow laths with a plurality of pockets formed within the hollow laths, wherein the loose granular material is positioned in each of the plurality of pockets.

18. The article of footwear of claim 15 further comprising an outsole connected to the midsole such that lattice structure of the midsole is positioned between the upper and the outsole.

19. A method of making an article of footwear comprising:
- ejecting a granular material onto each of a plurality of layers of a lattice structure of a sole member;
- sintering a first portion of the ejected granular material in each of the plurality of layers to form a plurality of tubular structures in the sole member, the plurality of tubular structures forming a plurality of laths for the lattice structure;
- leaving a second portion of the ejected granular material un-sintered in each of the plurality of layers such that loose granular material is provided within and at least partially fills the plurality of tubular structures; and
- coupling the sole member including the lattice structure to an upper of the article of footwear.

\* \* \* \* \*